(12) United States Patent
Omojola

(10) Patent No.: US 11,042,863 B1
(45) Date of Patent: Jun. 22, 2021

(54) GROUPING PAYMENTS AND PAYMENT REQUESTS

(71) Applicant: Square, Inc., San Francisco, CA (US)

(72) Inventor: Ayokunle Omojola, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 497 days.

(21) Appl. No.: 14/664,775

(22) Filed: Mar. 20, 2015

(51) Int. Cl.
*G06Q 20/22* (2012.01)
*G06Q 20/10* (2012.01)
*G06Q 20/32* (2012.01)
*G06Q 20/40* (2012.01)

(52) U.S. Cl.
CPC .......... *G06Q 20/22* (2013.01); *G06Q 20/102* (2013.01); *G06Q 20/327* (2013.01); *G06Q 20/40* (2013.01)

(58) Field of Classification Search
CPC ........ G06Q 20/20; G06Q 20/10; G06Q 40/00; G06Q 20/22; G06Q 20/38; G06Q 20/322; G06Q 20/40; G06Q 20/102; G06Q 20/327; H04M 15/745
USPC .............. 705/16, 30, 34, 35, 37; 379/114.05
See application file for complete search history.

(56) References Cited

U.S. PATENT DOCUMENTS

| | | | | |
|---|---|---|---|---|
| 5,787,402 A | * | 7/1998 | Potter | G06Q 20/10 705/37 |
| 6,330,550 B1 | | 12/2001 | Brisebois et al. | |
| 7,269,251 B1 | * | 9/2007 | Jokinen | H04M 15/745 379/114.05 |
| 7,606,734 B2 | * | 10/2009 | Baig | G06Q 30/06 705/26.35 |
| 7,716,129 B1 | | 5/2010 | Tan et al. | |
| 7,725,375 B2 | | 5/2010 | Shepherd | |
| 7,814,017 B2 | * | 10/2010 | Vancini | G06Q 20/10 705/34 |
| 8,010,993 B1 | * | 8/2011 | Bartholomay | H04L 63/10 726/1 |
| 8,140,418 B1 | | 3/2012 | Casey et al. | |

(Continued)

FOREIGN PATENT DOCUMENTS

| | | | | |
|---|---|---|---|---|
| JP | 2003-256522 | * | 9/2003 | ............ G06F 17/60 |
| KR | 10-2000-0072676 A | | 12/2000 | |
| WO | 2015/179681 A | | 11/2015 | |

OTHER PUBLICATIONS

"Going Dutch," definition Wikipedia (Mar. 25, 2006).*

(Continued)

*Primary Examiner* — Daniel S Felten
(74) *Attorney, Agent, or Firm* — Baker Botts L.L.P.

(57) ABSTRACT

A group money transfer technology that enables a sender to send a group payment or a group request for payment to any number of users that are nearby to effect multiple money transfer transactions are disclosed. The sender can use a payment application executing on his or her mobile device to input an amount and select a group payment or a group request for payment as a request type. In response, the payment application identifies multiple individuals that are nearby the sender or in the same geo-fenced area and are likely to be the intended recipients. The identification of the multiple individuals can be based on location alone, or in combination with one or more contextual criteria based on contact information, schedule information, transaction history information, and the like.

22 Claims, 12 Drawing Sheets

(56) References Cited

U.S. PATENT DOCUMENTS

| | | | |
|---|---|---|---|
| 8,380,591 B1* | 2/2013 | Kazenas | G06Q 20/102 |
| | | | 705/30 |
| 8,401,968 B1* | 3/2013 | Schattauer | G06Q 20/40 |
| | | | 705/44 |
| 8,447,666 B1 | 5/2013 | Keld | |
| 8,539,568 B1 | 9/2013 | Milas | |
| 8,571,975 B1 | 10/2013 | Lehman et al. | |
| 8,606,703 B1* | 12/2013 | Dorsey | G06Q 10/107 |
| | | | 705/39 |
| 8,639,621 B1 | 1/2014 | Ellis et al. | |
| 8,688,540 B1 | 4/2014 | Patel et al. | |
| 8,874,477 B2* | 10/2014 | Hoffberg | G06Q 10/103 |
| | | | 705/37 |
| 9,402,000 B2* | 7/2016 | Raj | H04L 12/1475 |
| 9,875,469 B1* | 1/2018 | Chin | G06Q 20/14 |
| 9,922,324 B2 | 3/2018 | Wilson et al. | |
| 10,102,518 B2* | 10/2018 | Arthur | G06Q 20/322 |
| 10,510,034 B2* | 12/2019 | Larson | G06Q 10/06393 |
| 10,510,079 B2* | 12/2019 | Larson | G06Q 20/10 |
| 10,776,809 B1 | 9/2020 | Aaron et al. | |
| 2002/0029342 A1 | 3/2002 | Keech | |
| 2002/0111907 A1 | 8/2002 | Ling | |
| 2002/0147658 A1 | 10/2002 | Kwan | |
| 2003/0217005 A1 | 11/2003 | Drummond et al. | |
| 2004/0267660 A1 | 12/2004 | Greenwood et al. | |
| 2005/0021400 A1 | 1/2005 | Postrel | |
| 2005/0021401 A1 | 1/2005 | Postrel | |
| 2005/0050145 A1 | 3/2005 | Lowe | |
| 2005/0192893 A1 | 9/2005 | Keeling et al. | |
| 2005/0273405 A1* | 12/2005 | Chen | G06Q 40/00 |
| | | | 705/35 |
| 2006/0006226 A1 | 1/2006 | Fitzgerald et al. | |
| 2006/0131385 A1 | 6/2006 | Kim | |
| 2006/0208066 A1 | 9/2006 | Finn et al. | |
| 2007/0119918 A1 | 5/2007 | Hogg et al. | |
| 2007/0192191 A1 | 8/2007 | Neal et al. | |
| 2007/0198360 A1* | 8/2007 | Rogers | G06Q 20/20 |
| | | | 705/16 |
| 2007/0198432 A1* | 8/2007 | Pitroda | G06Q 20/327 |
| | | | 705/64 |
| 2007/0271342 A1 | 11/2007 | Brandt et al. | |
| 2008/0059375 A1 | 3/2008 | Abifaker | |
| 2008/0103968 A1 | 5/2008 | Bies et al. | |
| 2008/0189186 A1 | 8/2008 | Choi et al. | |
| 2008/0276308 A1 | 11/2008 | Graser et al. | |
| 2009/0171794 A1 | 7/2009 | Hogan et al. | |
| 2009/0228966 A1* | 9/2009 | Parfene | G06F 21/31 |
| | | | 726/7 |
| 2009/0270077 A1 | 10/2009 | Fiorini et al. | |
| 2010/0017334 A1 | 1/2010 | Itoi et al. | |
| 2010/0121764 A1 | 5/2010 | Niedermeyer | |
| 2010/0131409 A1 | 5/2010 | Lawyer et al. | |
| 2010/0186066 A1 | 7/2010 | Pollard | |
| 2010/0198728 A1* | 8/2010 | Aabye | G06Q 20/32 |
| | | | 705/44 |
| 2011/0022472 A1 | 1/2011 | Zon | |
| 2011/0035287 A1 | 2/2011 | Fox | |
| 2011/0047045 A1 | 2/2011 | Brody et al. | |
| 2011/0082767 A1 | 4/2011 | Ryu et al. | |
| 2011/0113068 A1 | 5/2011 | Duyang et al. | |
| 2011/0119155 A1 | 5/2011 | Hammad et al. | |
| 2011/0218880 A1 | 9/2011 | Hammad et al. | |
| 2011/0219230 A1 | 9/2011 | Oberheide et al. | |
| 2011/0238539 A1 | 9/2011 | Phillips et al. | |
| 2011/0287726 A1 | 11/2011 | Huang | |
| 2011/0307388 A1 | 12/2011 | Kim et al. | |
| 2012/0036042 A1 | 2/2012 | Graylin et al. | |
| 2012/0101896 A1 | 4/2012 | Veeneman et al. | |
| 2012/0130898 A1 | 5/2012 | Snyder et al. | |
| 2012/0131121 A1 | 5/2012 | Snyder et al. | |
| 2012/0143722 A1 | 6/2012 | John | |
| 2012/0166334 A1 | 6/2012 | Kimberg et al. | |
| 2012/0191569 A1 | 7/2012 | Shah | |
| 2012/0226588 A1 | 9/2012 | Wuhrer et al. | |
| 2012/0295580 A1 | 11/2012 | Corner | |
| 2012/0310752 A1 | 12/2012 | Gaddis | |
| 2012/0323717 A1 | 12/2012 | Kirsch | |
| 2013/0041821 A1 | 2/2013 | Kingston et al. | |
| 2013/0046707 A1 | 2/2013 | Maskatia et al. | |
| 2013/0054395 A1 | 2/2013 | Cyr et al. | |
| 2013/0080415 A1 | 3/2013 | Maskatia et al. | |
| 2013/0085804 A1 | 4/2013 | Leff et al. | |
| 2013/0138535 A1 | 5/2013 | Hsiao | |
| 2013/0159173 A1* | 6/2013 | Sivaraman | G06Q 20/22 |
| | | | 705/39 |
| 2013/0291099 A1 | 10/2013 | Donfried et al. | |
| 2013/0297425 A1 | 11/2013 | Wallaja | |
| 2013/0305367 A1 | 11/2013 | Yoshioka et al. | |
| 2014/0019290 A1 | 1/2014 | Beaver | |
| 2014/0019352 A1 | 1/2014 | Shrivastava | |
| 2014/0108235 A1* | 4/2014 | Chelst | G06Q 20/22 |
| | | | 705/39 |
| 2014/0108263 A1 | 4/2014 | Ortiz et al. | |
| 2014/0164254 A1 | 6/2014 | Dimmick | |
| 2014/0180826 A1 | 6/2014 | Boal | |
| 2014/0201067 A1 | 7/2014 | Lai et al. | |
| 2014/0214658 A1* | 7/2014 | Hammad | G06Q 20/12 |
| | | | 705/39 |
| 2014/0230039 A1 | 8/2014 | Prakash et al. | |
| 2014/0236838 A1 | 8/2014 | Asar et al. | |
| 2014/0307735 A1 | 10/2014 | Lerner | |
| 2014/0310090 A1 | 10/2014 | Postrel | |
| 2014/0351118 A1* | 11/2014 | Zhao | G06Q 20/3224 |
| | | | 705/40 |
| 2014/0351126 A1 | 11/2014 | Priebatsch | |
| 2015/0006529 A1 | 1/2015 | Kneen et al. | |
| 2015/0052062 A1 | 2/2015 | Flomin et al. | |
| 2015/0095990 A1 | 4/2015 | Ranganathan et al. | |
| 2015/0134518 A1 | 5/2015 | Turovsky et al. | |
| 2015/0281238 A1 | 10/2015 | Ramachandran et al. | |
| 2015/0293622 A1 | 10/2015 | Han et al. | |
| 2015/0304250 A1 | 10/2015 | Zomet et al. | |
| 2015/0332230 A1 | 11/2015 | Gaines et al. | |
| 2015/0339656 A1 | 11/2015 | Wilson et al. | |
| 2015/0339668 A1 | 11/2015 | Wilson et al. | |
| 2016/0042328 A1* | 2/2016 | Teckchandani | G06Q 10/00 |
| | | | 705/44 |
| 2017/0154323 A1* | 6/2017 | Bohrer | G06Q 20/389 |
| 2018/0047008 A1* | 2/2018 | Ayyagari | G06Q 20/40 |
| 2020/0118128 A1 | 4/2020 | Wilson et al. | |

OTHER PUBLICATIONS

Apple Inc., "In App Purchase Programming Guide," published Jun. 17, 2011, Retrieved from the Internet URL: https://www.rapid-ideas.com/previews/wsa/page9/files/StoreKitGuide.pdf, pp. 1-38.

Non-Final Office Action dated Dec. 16, 2014, U.S. Appl. No. 14/283,504, of Wilson, J., et al., filed May 21, 2014.

Final Office Action dated Apr. 21, 2015, U.S. Appl. No. 14/283,504, of Wilson, J., et al., filed May 21, 2014.

Non-Final Office Action dated Dec. 1, 2015, U.S. Appl. No. 14/283,504, of Wilson, J., et al., filed May 21, 2014.

Final Office Action dated Mar. 23, 2016, U.S. Appl. No. 14/283,504, of Wilson, J., et al., filed May 21, 2014.

Non-Final Office Action dated Apr. 6, 2016, U.S. Appl. No. 14/284,224, of Wilson, J., et al., filed May 21, 2014.

Non-Final Office Action dated Oct. 4, 2016, for U.S. Appl. No. 14/283,504, of Wilson, J., et al., filed May 21, 2014.

Final Office Action dated Oct. 6, 2016, for U.S. Appl. No. 14/284,224, of Wilson, J., et al., filed May 21, 2014.

Non-Final Office Action dated Dec. 5, 2016, for U.S. Appl. No. 14/283,617, of Wilson, J., et al., filed May 21, 2014.

Advisory Action dated Dec. 27, 2016, for U.S. Appl. No. 14/284,224, of Wilson, J., et al., filed May 21, 2014.

Non-Final Office Action dated Apr. 7, 2017, for U.S. Appl. No. 14/284,224, of Wilson, J., et al., filed May 21, 2014.

Final Office Action dated May 30, 2017, for U.S. Appl. No. 14/283,504, of Wilson, J., et al., filed May 21, 2014.

Non-Final Office Action dated Jun. 29, 2017, for U.S. Appl. No. 14/506,541, of Aaron, P., et al., filed Oct. 3, 2014.

(56) References Cited

OTHER PUBLICATIONS

Final Office Action dated Jul. 12, 2017, for U.S. Appl. No. 14/283,617, of Wilson, J., et al., filed May 21, 2014.
Notice of Allowance dated Nov. 30, 2017, for U.S. Appl. No. 14/284,224, of Wilson, J., et al., filed May 21, 2014.
Non-Final Office Action dated Mar. 8, 2018, for U.S. Appl. No. 14/283,617, of Wilson, J., et al., filed May 21, 2014.
Final Office Action dated Mar. 8, 2018, for U.S. Appl. No. 14/506,541, of Aaron, P., et al., filed Oct. 3, 2014.
Final Office Action dated Jan. 18, 2019, for U.S. Appl. No. 14/283,617, of Wilson J. et al., filed May 21, 2014.
Non-Final Office Action dated Apr. 4, 2019, for U.S. Appl. No. 14/506,541, of Aaron, P., et al., filed Oct. 3, 2014.
International Search Report and Written Opinion for International Application No. PCT/US2015/032030, dated Aug. 31, 2015.
Final Office Action dated Oct. 24, 2019, for U.S. Appl. No. 14/506,541, of Aaron, P., et al., filed Oct. 3, 2014.
Final Office Action dated Nov. 5, 2019, for U.S. Appl. No. 14/283,617, of Wilson, J., et al., filed May 21, 2014.
Non-Final Office Action dated Jun. 19, 2019, for U.S. Appl. No. 14/283,617, of Wilson, J., et al., filed May 21, 2014.
Examination Report No. 2 for Australian Patent Application No. 2015264085, dated Jun. 18, 2020.
Itemize LLC., "Itemized Receipt Extraction Using Machine Learning", Journal of Robotics & machine learning, in Patent Application Approval Process, Retrieved from the Internet URL:http://dialog.proquest.com/professional/docview/1267645443?accountid=131444, on 2013.
Non-Final Office Action dated Feb. 13, 2020, for U.S. Appl. No. 16/712,856, of Wilson, J., et al., filed Dec. 12, 2019.
Notice of Allowance dated Apr. 3, 2020, for U.S. Appl. No. 14/506,541, of Aaron, P., et al., filed Oct. 3, 2014.
Examination Report No. 1 for Australian Patent Application No. 2015264085, dated Jan. 16, 2020.
Final Office Action dated May 21, 2020, for U.S. Appl. No. 16/712,856, of Wilson, J., et al., filed Dec. 12, 2019.
Advisory Action dated Aug. 3, 2020, for U.S. Appl. No. 16/712,856, of Wilson, J., et al., filed Dec. 12, 2019.
Notice of Allowance dated Aug. 10, 2020, for U.S. Appl. No. 14/506,541, of Aaron, P., et al., filed Oct. 3, 2014.
Non-Final Office Action dated Oct. 5, 2020, for U.S. Appl. No. 16/712,856, of Wilson, J., et al., filed Dec. 12, 2019.

\* cited by examiner

GROUPING PAYMENTS AND PAYMENT REQUESTS

BACKGROUND

Users are now able to conduct payment transactions, including person-to-person money transfer transactions, using applications on their mobile computing devices ("mobile devices"), e.g., "smartphones." Some of these existing applications provide a "pay nearby" feature to enable a sender to send money to or request money from a contact who is nearby or in close proximity to the sender (e.g., within a distance of few meters). When money is to be sent or requested from a large number of people, these existing applications generally require the sender to manually input or select recipients one by one. As an example, when multiple people dine together, one person may pay the bill, but may request the other diners in the group to pay their portion of the bill. As another example, one person may need to pay multiple nearby people, e.g., for completing an assigned task for which they are owed some remuneration. The process for identifying multiple people in a group and either requesting or transmitting a payment can become cumbersome and time consuming, e.g., when there are multiple people to be identified.

BRIEF DESCRIPTION OF THE DRAWINGS

The disclosed technology for identifying nearby users that are likely to be the intended recipients and sending a group payment or group request for payment to those nearby users to effect multiple money transfer transactions (hereinafter "group money transfer technology") introduced here may be better understood by referring to the following Detailed Description in conjunction with the accompanying drawings, in which like reference numerals indicate identical or functionally similar elements.

DETAILED DESCRIPTION

Figure 1:
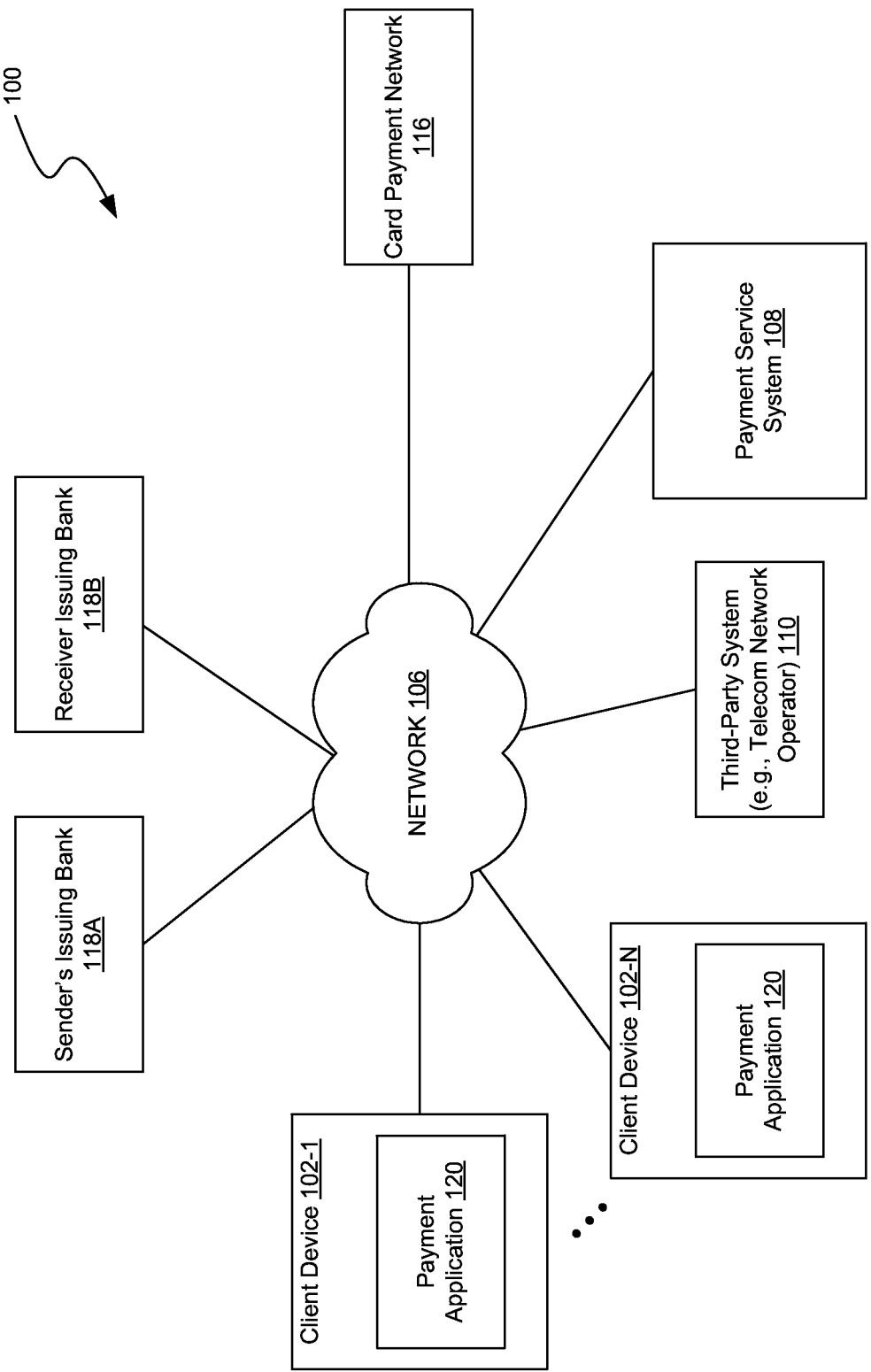
FIG. 1 is a block diagram illustrating a network-based environment in which the group money transfer technology can operate.

A group money transfer technology is disclosed for generating and sending a group payment or a request to a group for payment (each hereinafter "a group request") to multiple recipients (e.g., a "group" of recipients) who are nearby or in proximity to a sender of the group request ("disclosed technology"). The group request when transmitted from the sender's device effects multiple money transfer transactions involving financial accounts of the sender and the recipients.

In some embodiments, the disclosed technology enables a user (e.g., a sender) to send an amount of money to or request an amount of money from any number of individuals who are nearby (e.g., in proximity) to the sender using a single group request. For example, consider a holiday party in a conference room in an office. Client devices of individuals in the conference room can "ping" each other to establish a connection using low energy wireless technology such as Bluetooth Low Energy (BLE) wireless technology, local Wi-Fi technology, or the like. A payment application associated with a payment service system on any one client device can exchange user identifying information with other client devices over, for example, the BLE connection. Thus, each payment application can discover or identify other individuals that are nearby. Moreover, in some embodiments, the range over which a payment application can exchange information with another payment application can be user configurable. In the example above, an office manager can use a payment application on his or her client device to input a fixed amount (e.g., $50) and select a group payment as a request type. The payment application then automatically identifies all individuals that are in the conference room as recipients of the group request. When the office manager submits the group request using a single action, the submission of the group request causes funds to be transmitted from a financial account associated with the office manager to financial accounts of all the individuals present in the conference room, e.g., $50 per individual in the group. Alternatively, the office manager may select a fixed amount (e.g., $50) to be shared among the individuals in the group. In some embodiments, the amount that each individual would receiver can be randomized. For example, one individual can receive $5, while another can receive $10. In yet other embodiments, one or more restrictions can be placed on the number of individuals (e.g., 15 individuals). If some of the individuals do not have a financial account pre-registered with the payment service system, a notification can be sent to those individuals to request financial account information for the deposit. In this manner, the disclosed technology provides a practical solution to the problem of sending money to or requesting money from multiple individuals that are within a distance from each other. Using the disclosed technology, the sender need not manually input or select the names of individuals nearby. Moreover, in some embodiments, the sender can adjust the distance and thereby increase or decrease the number of recipients that can be targeted by a single group request. Use of the disclosed technology, thus, results in significant time savings for the sender. Moreover, as the disclosed technology uses a single group request to trigger multiple money transfer transactions, the back and forth required to affect multiple money transfer transactions can be reduced and network resource usage can be significantly reduced.

In some embodiments, the disclosed technology enables a sender to send an amount of money to or request an amount of money from a group of nearby individuals who are likely to be the intended recipients. For example, consider a scenario in which a group of five individuals are in a restaurant for dinner. The client devices of the five individuals can be connected to each other using a low energy wireless technology such as BLE wireless technology. Suppose one individual pays the bill, and the rest need to pay the bill payer their share of the bill. The bill payer can launch a payment application associated with a payment service system on his or her client device, select a group payment request as the request type and input a fixed amount to be requested. The payment application can then identify the four individuals, and possibly other individuals who are nearby the bill payer. The payment application can then use contextual information, for example, contact information, schedule information (e.g., calendar events or appointments), social network posts, transaction history information, and/or the like associated with the bill payer to identify, from all the individuals that are nearby, only those that are likely to be the intended recipients of the group request. In some embodiments, the contextual information describes a pre-existing relationship between the bill payer and the identified individuals. In this example, the payment application may identify a calendar appointment at or near the time of request that lists the four individuals as attendees. Based on this contextual information, the payment application can determine that the four individuals are the most likely candidates to receive the group request. A group request including identifiers associated with the identified recipients and an amount can then be generated by the payment application for sending by the bill payer. Once the group request is sent, the payment service system sends each of the recipients identified in the group request a payment request for the specified amount. In some embodiments, the requestor can identifying variable amounts for each individual in the group, e.g., based on each individual's actual consumption of food and beverages.

By using the disclosed technology to automatically identify the intended recipients of the group request based on location and contextual criteria, the sender need not manually input recipient information, or perform bump or touch actions with devices of the recipients. With less time spent on data entry, money transfer transactions according to the disclosed technology can be conducted in a fast and reliable manner.

In some embodiments, the disclosed technology enables sending of a group request to any number of individuals in a geo-fenced area. For example, consider an event occurring at a neighborhood park. A virtual boundary can be set up around the geo-graphical boundary of the park to form a geo-fenced area. The event organizer, via a payment application or a web-based interface, can input a fixed amount (e.g., $5), specify the group request as a group payment request and send the group request so that everyone who is within the geo-fenced area receives a notification to donate the requested amount of $5. In some embodiments, location monitoring to detect a device entering or exiting the geo-fenced area can be performed client-side. This enables everyone who is in the geo-fenced area at a certain time to be automatically prompted with a request to donate $5 by payment applications on their client devices. Alternatively, an individual can be prompted with a request to donate $5 immediately upon entering or exiting from the geo-fenced area. In other embodiments, a telecom network operator can perform the location monitoring to identify subscribers that are in the geo-fenced area, or subscribers that have entered or exited the geo-fenced area. The telecom network operator can then send a notification, via a text message (e.g., SMS, MMS) to each identified subscriber to donate $5.

Sending a group request in this manner thus allows a sender to collect money from or distribute money to a large number of individuals, without having to contact each individual separately. Moreover, in some embodiments, the individuals need not be users registered with a payment service system or have a payment application installed on their mobile devices to receive the group request. Individuals having an account with the payment service system but no payment application can reply to the text message to donate the amount. Similarly, individuals that do not have an account and do not have a payment application can provide payment details in reply to the text message or on a web-based interface to donate the amount.

In some embodiments, the disclosed technology can pre-generate a group request for a sender to send when one or more conditions are met. The group request can be pre-generated without receiving an explicit indication from the sender. For example, suppose a user pays $60 for a cab ride with two of his friends using an application associated with a payment service system or a third-party application affiliated with the payment service system. That transaction can trigger the payment application or the payment service system to determine whether the user is with one or more companions (e.g., based on proximity, location monitoring and/or schedule information) and if so, to identify those companions. The user can then be prompted to confirm whether a group request for payment of a determined amount (e.g., $20 per person based on the total transaction amount and the number of cab riders) is to be sent to the identified companions. If the user confirms sending of the group request, the payment service system can process the group request by sending to each of the two friends a payment request for $20.

Various embodiments and implementations of the disclosed technology will now be described. The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed technology.

FIG. 1 is a block diagram illustrating a network-based environment in which the group money transfer technology can operate. The environment 100 can include multiple client devices 102-1, 102-N for sending and receiving group payments and/or group payment requests. For example, the client device 102-1 can be a sender device associated with a sender of the group request and the client device 102-N can be receiver device associated with one of the receivers or recipients of the group request. The client devices 102-1, 102-N can be a desktop computer, a laptop computer, a mobile device, a tablet, or any other processing device. The mobile device can be, for example, a smart phone, a tablet computer, a phablet, a notebook computer, a wearable device, or any other form of mobile processing device. In some embodiments, the client devices 102-1, . . . , 102-N can include a network interface based on Bluetooth technology (e.g., Bluetooth Low Energy or BLE) to enable the client devices to detect and establish a connection with other client devices having a similar network interface that are nearby, and exchange information over the established connection. In some embodiments, the client devices 102-1, 102-N can include a payment application 120 that interfaces with the network interface and provides user identifying information for exchange with the nearby client devices. Such user identifying information that can be exchanged between nearby client devices can include, but is not limited to: a user identifier (e.g., username or UID), an application identifier, a device identifier, a phone number, an email address, an alias, or any other information that enables a payment application 120 of a client device to, directly or by querying a remote server (e.g., payment service system 108), identify a user of a client device. The payment application 120 further enables a sender to send a group request to multiple recipients who are detected to be nearby, or match certain location and contextual criteria.

The environment 100 can also include other computer systems. Such computer systems can include computer systems of the sender's issuing bank 118A and the receiver's issuing bank 118B. The issuing banks issue payment cards (e.g., debit cards, credit cards, prepaid cards, gift cards, and so on). The sender has a sender financial account with the sender's issuing bank 118A and can use a payment card issued by the sender's issuing bank 118A to access the sender financial account to deposit or withdraw funds. Similarly, the receiver has a receiver financial account with the receiver's issuing bank 118B and can use a payment card issued by the receiver's issuing bank 118B to access the receiver financial account to deposit or withdraw funds. The environment 100 also includes a computer system of a card payment network (hereinafter "card payment network 116") which can be a credit and/or debit card processing network that handles authorization and settlement of transactions made using debit and/or credit cards.

The environment 100 also includes a computer system of a payment service (hereinafter "payment service system 108") associated with the payment application 120. The payment service system 108 facilitates electronic transfer of money from a sender's financial account to a receiver's financial account. In order for the transfer of money to occur, the sender and the receiver each have a user account with the payment service system. The user account is associated with or linked to a payment card such as a debit card, a credit card, a prepaid card, or the like. The payment service system 108 receives group requests (e.g., from sender devices) to send a group payment or a group request for payment. Such group requests can be made using the payment application 120. A sender can specify an amount and select group payment or group request for payment as a request type using the payment application 120. The payment application 120 can then automatically generate an email message or text message populated with the necessary information for sending by the sender. For example, the "To" field of the email message can be populated with the email addresses of the recipients identified by the payment application 120, the "Cc" field can be populated with an email address associated with the payment service system 108 and the amount of the group request can be included in the body of the message. In other embodiments, the payment application 120 can generate a text message or an HTTP request including the recipient information, the amount of the group request, and a type of the group request.

The payment service system 108 receives the email message (or text message or HTTP request) sent by the sender and parses the email message to extract a sender email address of the sender, receiver email addresses of the receivers and the amount to be requested or sent. If the email message is for sending a group payment request, the payment service system 108 can send an email message or a push notification to each of the receiver email addresses to notify the receivers regarding the sender's payment request. A receiver can then approve the request (e.g., via the email message, the push notification) to trigger the transfer of the requested payment amount from the receiver's financial account to the sender's financial account.

If the email message is for sending a group payment, the payment service system 108 generates and sends a payment request including the necessary information (e.g., a payment amount, the sender's payment card information, the receiver's payment card information) to the card payment network 116 (e.g., Star, NYCE or Pulse for debit card processing and Visa, MasterCard, etc., for debit/credit card processing) for authorization and settlement. The card payment network 116 communicates with the sender's issuing bank 118A and the receiver's issuing bank 118B to facilitate the transfer of the payment amount. After the payment request is approved, the sender's issuing bank 118A debits the sender's financial account in real time. As a part of the settlement process, the payment amount debited from the sender's financial account is sent to the receiver's financial account and the receiver's financial account is credited, thereby completing the transaction. Once the transaction is completed, a notification regarding the crediting or deposit of the payment amount can be sent to the receivers (e.g., via an email message, a text message, a push notification).

In some embodiments, the environment 100 includes a third-party system, for example, a telecom network operator 110. The telecom network operator 110 can monitor location of its subscribers, and communicate with the subscribers. The payment service system 108 can communicate with the telecom network operator 110, via an application program interface or other similar interface, to define a geo-fenced area and provide contents of a message to be sent to subscribers if they are detected in the geo-fenced area at a certain time, or once they are detected entering or leaving the geo-fenced area.

Each of the aforementioned computer systems can include one or more distinct physical computers and/or other processing devices which, in the case of multiple devices, can be connected to each other through one or more wired and/or wireless networks. All of the aforementioned devices are coupled to each other through an internetwork 106, which can be, or include, the Internet and one or more wired or wireless networks (e.g., a Wi-Fi network and/or a cellular telecommunications network).

The environment 100A can accommodate transactions involving payment cards such as debit cards, credit cards, pre-paid cards, bank accounts, mobile payment applications and the like. The payment application 120 can include an electronic wallet application, money transfer application (e.g., application for sending and requesting payments via email or text message), or any other application having an account that is linked to one or more payment cards and/or bank accounts and can be used by the owner of the client device to initiate transactions.

Figure 2:
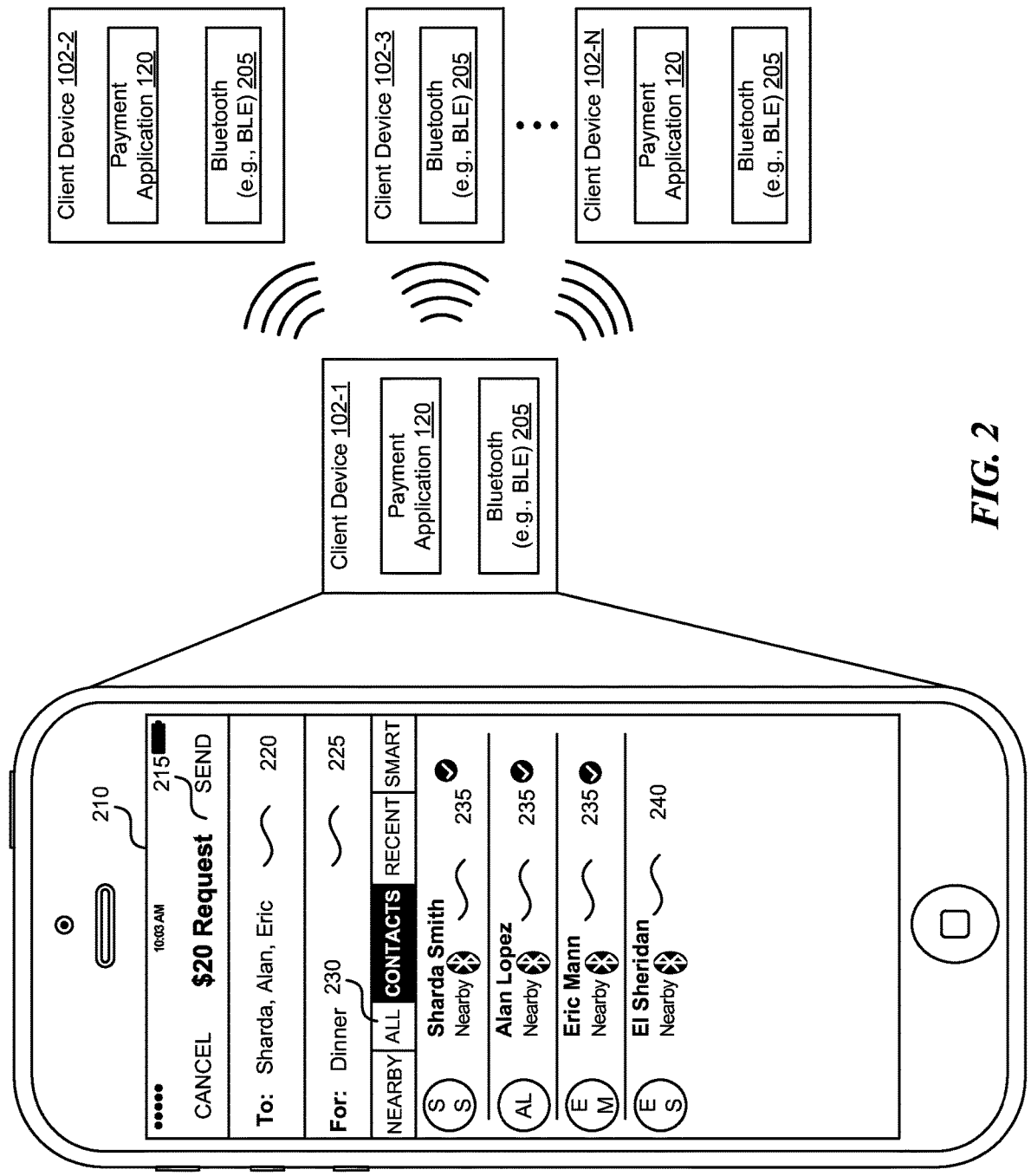
FIG. 2 is a block diagram illustrating an example user interface of a group payment request to be sent to multiple users detected as being nearby a sender device and identified being among the contacts of a sender.

FIG. 2 is a block diagram illustrating an example user interface of a group payment request to be sent to multiple users detected as being nearby a sender device and identified being among the contacts of a sender.

As illustrated, multiple client devices 102-1, 102-2, 102-3, 102-N are connected to each other via the Bluetooth (e.g., BLE) interface 205. In some embodiments, other low energy network interface can be used to establish a connection between the client devices. Some of the client devices (e.g., client devices 102-1, 102-2, 102-N) have a payment application 120 associated with the payment service system 108, while others (e.g., client device 102-3) do not have the payment application 12—installed on the client device. In response to an indication from a sender of the sender device (i.e., client device 102-1) to initiate a group request for payment, the payment application 120 generates a group request for payment. The user interface 210 depicts the group request for payment generated by the payment application 120. The user interface 210 can include, for example, an amount and a type of group request 215 (e.g., $20 Request), a "To" field 220 populated with the recipients that are identified by the payment application 120 as being the intended recipients of the group request, and a "For" field 225 for a reason for the group request. In some embodiments, the user interface 210 can also include one or more filters 230 for selecting the recipients of the group request. For example, when the "all" filter is selected, the payment application 120 identifies all users or client devices nearby the sender device 102-1, some of who may not be known to the user of the sender device 102-1. When the "contacts" filter is selected, the payment application 120 first identifies all users who are nearby, and then applies the "contacts" filter to select only those nearby users who are also contacts of the sender. Thus, in the illustrated example, the four listed users are the contacts that are nearby the sender device 102-1. In some situations, the sender may wish to send the group request to the contacts 235 and not the contact 240 who is also nearby. In such situation, the sender can deselect or uncheck the contact 240, which causes the "To" field 220 to be updated. The sender can then select the "Send" button to send the group request. In this manner, the payment application 120 enables the sender to send a group request to multiple "contacts" nearby without having to look up and select each recipient, type the email addresses of each recipient, or send multiple requests.

Figure 3:
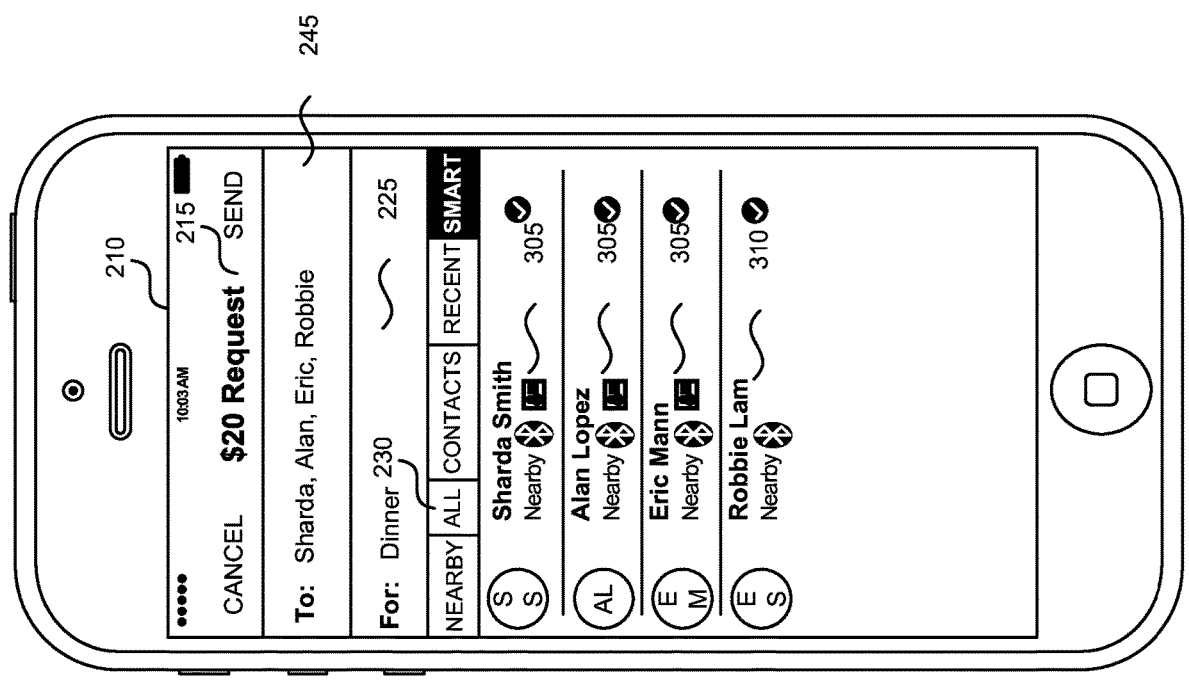
FIG. 3 is a block diagram illustrating an example user interface of a group payment request to be sent to multiple users detected as being nearby a sender device and identified as being likely to be attending an event with a sender based on schedule information.

FIG. 3 is a block diagram illustrating an example user interface of a group payment request to be sent to multiple users detected as being nearby a sender device and identified as being likely to be attending an event with a sender based on schedule information.

In some embodiments, the sender can apply a "smart" filter from the filter options 230 to identify recipients of the group request. The "smart" filter, in some embodiments, can be a combination of other filters that takes into account contextual information to identify multiple recipients who are likely to be the intended recipients of the group request. The contextual information can include, for example, schedule information. Schedule information can be derived from calendar events or appointments, social network posts, text messages, instant messages, and/or the like. When the "smart" filter is selected, the payment application 120 first identifies multiple users who are nearby the sender. The payment application 120 then applies the "smart" filter to select, from the list of users, those users who meet one or more criteria. For example, the "smart" filter can select those nearby users who along with the sender are attendees in a calendar event. In FIG. 3, while only users 305 are in the sender's contact list, all four users (305 and 310) are nearby the sender and are attendees in the calendar event. Thus the users 305 and 310 are identified as likely recipients of the group request and email addresses or other identifiers corresponding to the identified recipients are populated in the "To" field 245 of the group request.

Figure 4:
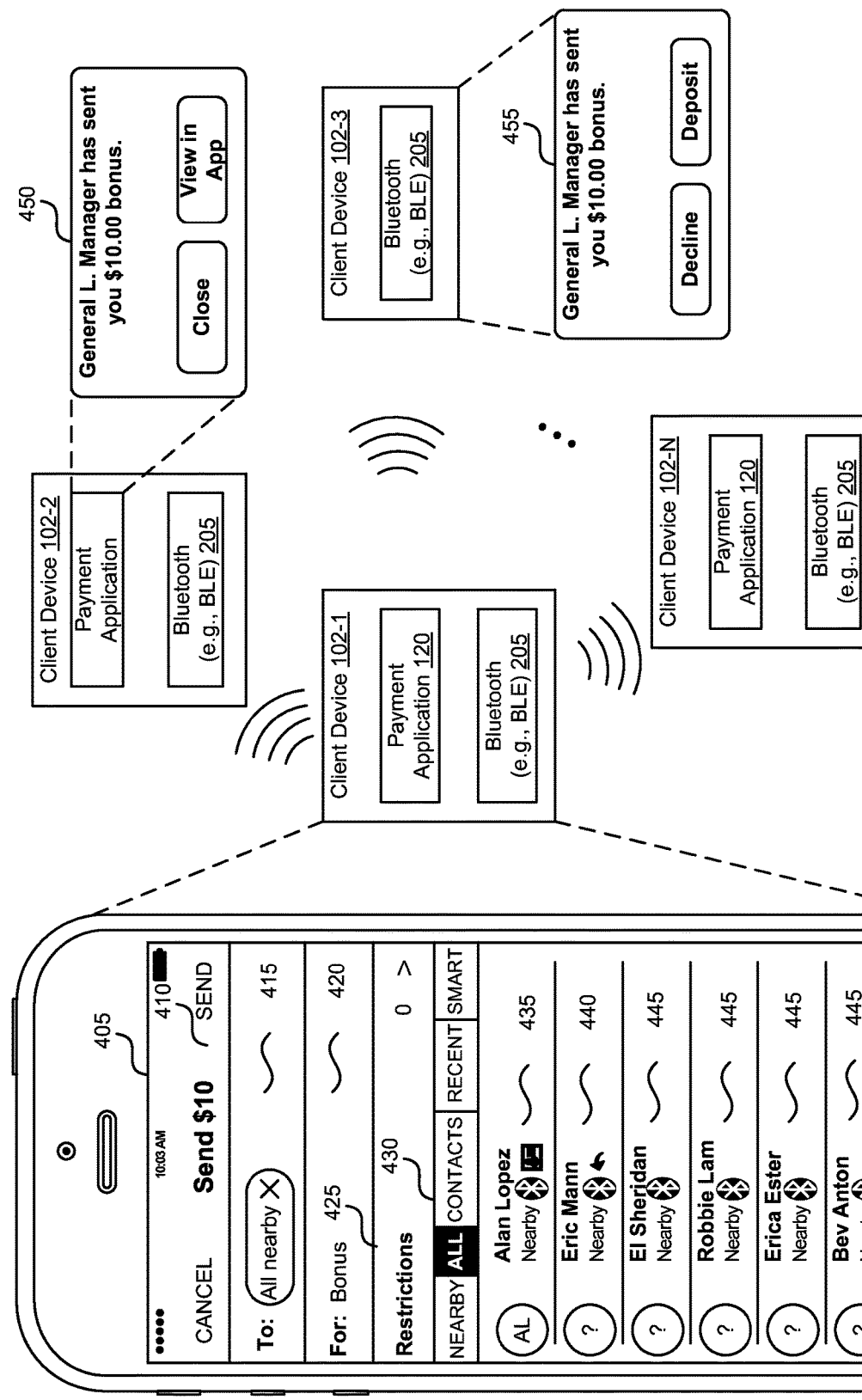
FIG. 4 is a block diagram illustrating an example user interface of a group payment to be sent from a sender device to other receiver devices detected as being nearby the sender device.

FIG. 4 is a block diagram illustrating an example user interface of a group payment to be sent from a sender device to other receiver devices detected as being nearby the sender device.

As illustrated, a sender device 102-1 has established a BLE connection with receiver devices 102-2, 102-3, ..., 102-N. When a sender associated with the sender device provides an indication to send a group payment, the payment application 120 in the sender device generates a message (e.g., email message) for group payment that is at least partially prepopulated with an amount 410 specified by the sender and multiple receivers that are likely to be the intended recipients of the message for group payment in the "To" field 415. The sender can also input a reason (e.g., "Bonus") for the group payment in the "For" field 420. In some embodiments, a restrictions field 425 may be available to impose restrictions on the group request (e.g., maximum number of receivers, time of delivery, and/or the like). Also shown on the user interface 405 is a list of receivers having receiver devices that the sender device 102-1 is connected to via BLE. In some embodiments, the sender can set up a filter 430 to select a subset of the nearby receivers. In the illustrated example, all nearby receivers are listed. When the "all" filter is selected, the payment application lists all nearby receivers, including receiver 435 who is in the sender's contact list, receiver 440 who has previously engaged in a transaction with the sender and receivers 445 that the sender may or may not know. When the sender selects the send button, the payment application sends a group payment of $10 to the payment service system 108 and causes the payment service system to deposit $10 into the financial accounts associated with the receivers. The receiver devices that have the payment applications installed thereon can then receive a notification (e.g., notification 450) from the payment service system 108 regarding the deposit of the payment.

In some instances, a receiver device 102-3 may not have a payment application 120 associated with the payment service system 108. The payment service system 108 can then send an email or text message (e.g., message 455), if an email address or phone number corresponding to the receiver device 102-3 available, to notify that the sender has sent a payment of $10 to the receiver. The receiver can either decline, or deposit the payment into his or her bank account by providing information about the bank account or a payment card linked to the bank account.

In some instances, the receiver device 102-3 may not have a payment application 120 and may not share a phone number or an email address with the sender. In such instances, the payment application 120 of the sender device can send a message directly to the receiver device 102-3 over the BLE connection to notify the receiver device regarding the payment, and instructions for declining or depositing the payment.

Figure 5:
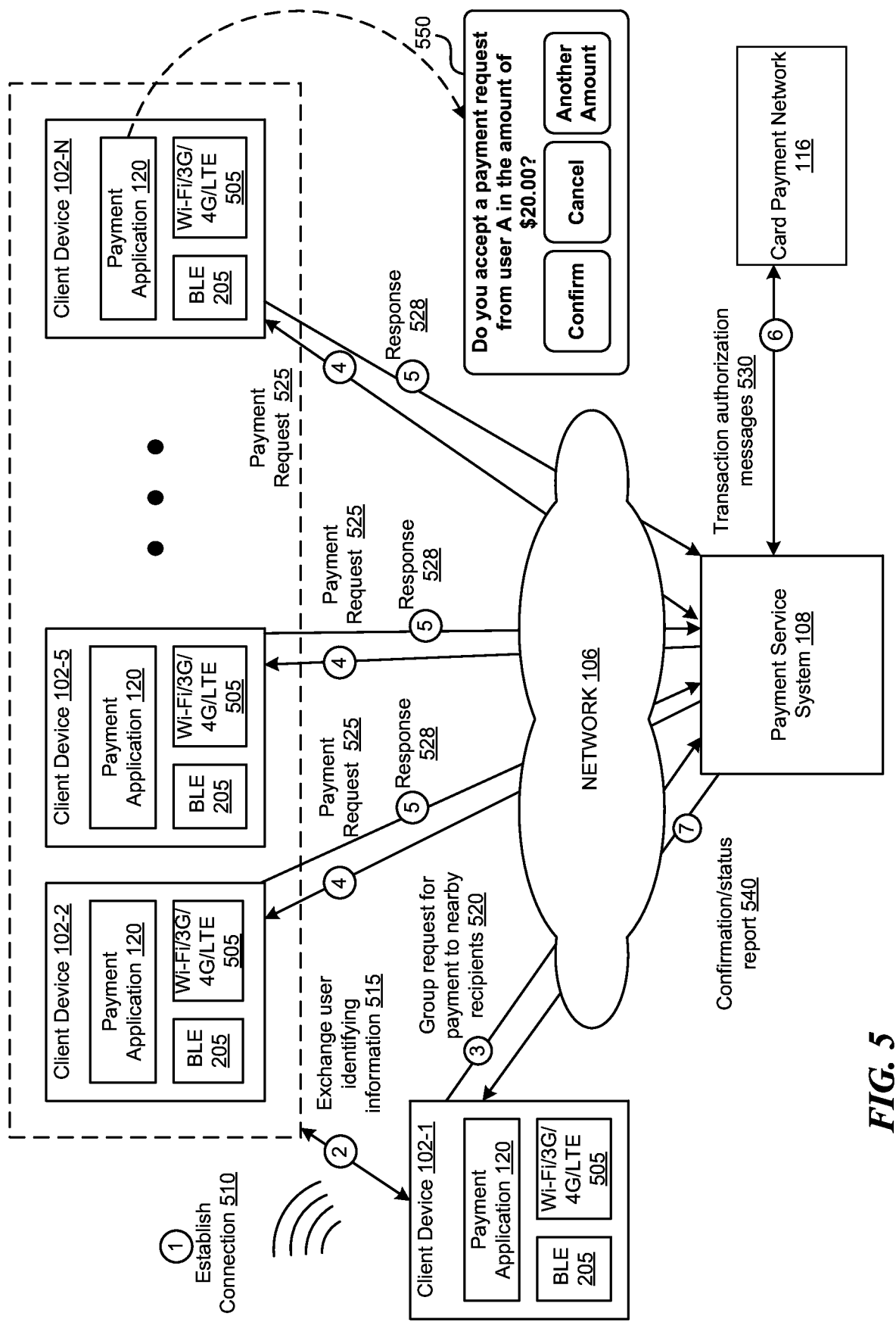
FIG. 5 is a block diagram illustrating an example group money transfer flow involving a payment application in accordance with a first embodiment of the group money transfer technology.

FIG. 5 is a block diagram illustrating an example group money transfer flow involving a payment application in accordance with a first embodiment of the group money transfer technology.

As illustrated, client device 102-1 is a sender device and client devices 102-2, 102-4, . . . , 102-N are receiver devices. In the illustrated embodiment, each of the sender and receiver devices have a BLE chip or device 205 that enables the devices to discover each other and establish a BLE connection over which information (e.g., metadata) can be exchanged. Each of the sender and receiver devices can also include Wi-Fi and/or cellular (e.g., 3G, 4G, LTE) interfaces to establish a second connection to the network 106 over which communication with the payment service system 108 can occur.

The sender device 102-1 establishes a BLE connection with the receiver devices 102-2, 102-4, . . . , 102-N by exchanging messages 510 in accordance with the BLE protocol. The payment application 120 of the sender device exchanges information 515 with the payment applications 120 of the connected receiver devices over the BLE connection. The information 515 that is exchanged can include any user identifying information, such as a username, an email address, a phone number, a device identifier, an application identifier, and/or the like. For example, if device identifiers are exchanged between the sender and receiver devices, the payment application of each device can query the payment service system 108 to obtain a username or user profile information corresponding to the device identifier. The payment application 120 can then generate a group request for payment (or a group payment) directed to at least some of the receivers associated with the connected receiver devices. As described above, the receivers can be selected by applying a suitable filter. The sender associated with the sender device 102-1 can cause the payment application 120 in the sender device 102-1 to send the group request for payment 520 to the payment service system 108 using a second interface 505 other than the BLE interface 205.

The payment service system 108 receives and analyzes the group request for payment 520 to determine or extract details of the group request. The payment service system 108 then sends a payment request 525 to each receiver device associated with receivers included in the group request. The payment applications of the receiver devices receive the payment request 525 and can request the receivers to respond to the payment request. In some embodiments, each payment application can generate and display a notification (e.g., notification 550) to request the receiver to confirm or decline the payment request, or in some implementations, approve the payment request for a different amount. Each payment application 120, upon receiving a response from the receiver, sends the response 528 to the payment service system 108 over the network 106. The payment service system 108, upon receiving responses approving the payment request, exchanges messages 530 with the card payment network 115 for authorization and settlement. The messages 530 cause a transfer of the approved amount of funds from a financial account associated with each receiver to a financial account associated with the sender. The payment service system 108 can also send a confirmation 540 to the sender to inform the sender of the status of the group request (e.g., whether the transfer of funds has been initiated or completed, or which of the receivers are yet to respond).

In some embodiments, the payment request to each receiver device can be sent over the BLE connection, from the sender device. In such embodiments, once the sender sends the group payment request, the payment application generates, in the background, a message including details of the payment request to the receiver devices. The payment applications in the receiver devices intercept the request and request confirmation from the receiver (e.g., via push notification 550). The payment applications on the receiver devices can then send the responses, along with details of the request, to the payment service system 108 for further processing. In this manner, even if the receiver and sender devices are offline (i.e., not connected to Wi-Fi or cellular network), the sender can still send out the group request and the receivers can still receive and take action on the requests, and the backend processing of the group request/responses can occur once the receiver devices are back online.

Figure 6:
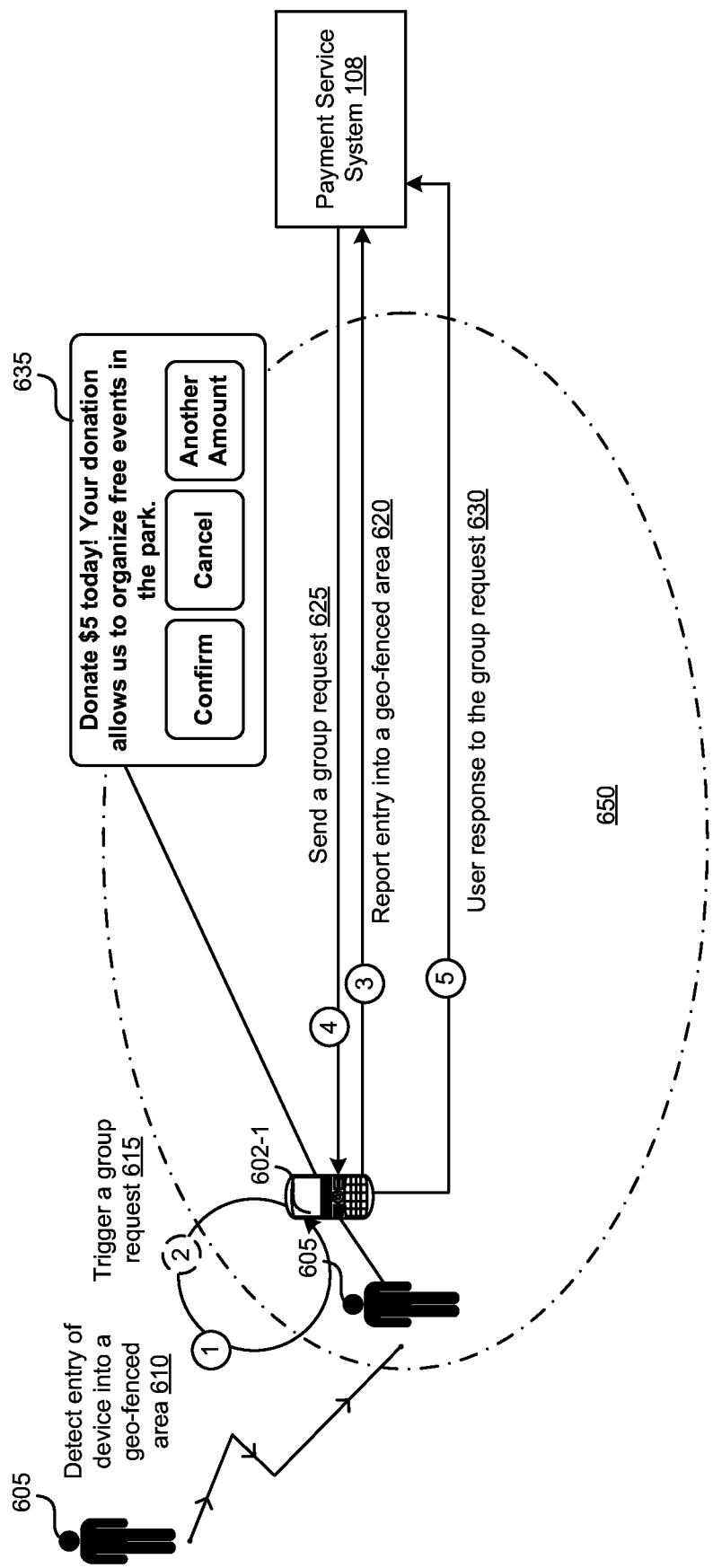
FIG. 6 is a block diagram illustrating a group money transfer flow involving a payment application and a geo-fenced area in accordance with a second embodiment of the group money transfer technology.

FIG. 6 is a block diagram illustrating a group money transfer flow involving a payment application and a geo-fenced area in accordance with a second embodiment of the group money transfer technology.

In some embodiments, a user can create a virtual boundary around a real-world geographical area to define a "geo-fenced" area and set up a group payment or a group payment request for a specified amount to be delivered to users who are in a geo-fenced area or who enter or exit the geo-fenced area. In the embodiment illustrated in FIG. 6, the presence of a client device in a geo-fenced area is detected client-side, by the client device itself. For example, the client device can be listening for data packets transmitted by a beacon in the geo-fenced area (e.g., using BLE technology). By way of another example, the client device can be monitoring its own location and comparing the monitored location against locations corresponding to a geo-fenced area.

Referring to FIG. 6, entry of a user 605 having a client device 602-1 into a geo-fenced area 650 can be detected by a payment application 120 on the client device 602-1 (610). In response, the payment application 120 can trigger a message relating to the group payment or group payment request corresponding to the geo-fenced area to be displayed on the client device (615). In some embodiments, the group request can be delivered to client devices having the payment application in advance. In other embodiments, the payment application can send a notification to the payment service system 108 that the client device has entered the geo-fenced area (620). In response, the payment service system 108 can send a group request corresponding to the geo-fenced area to the payment application (625). The message that is triggered can be, for example, a push notification (e.g., push notification 635) that provides information about the group request, and options for confirming or canceling/ignoring the group request or confirming an amount other than the requested amount. Once the user 605 responds to the message, the payment application can send the user response to the payment service system 108 for processing (630).

Figure 7:
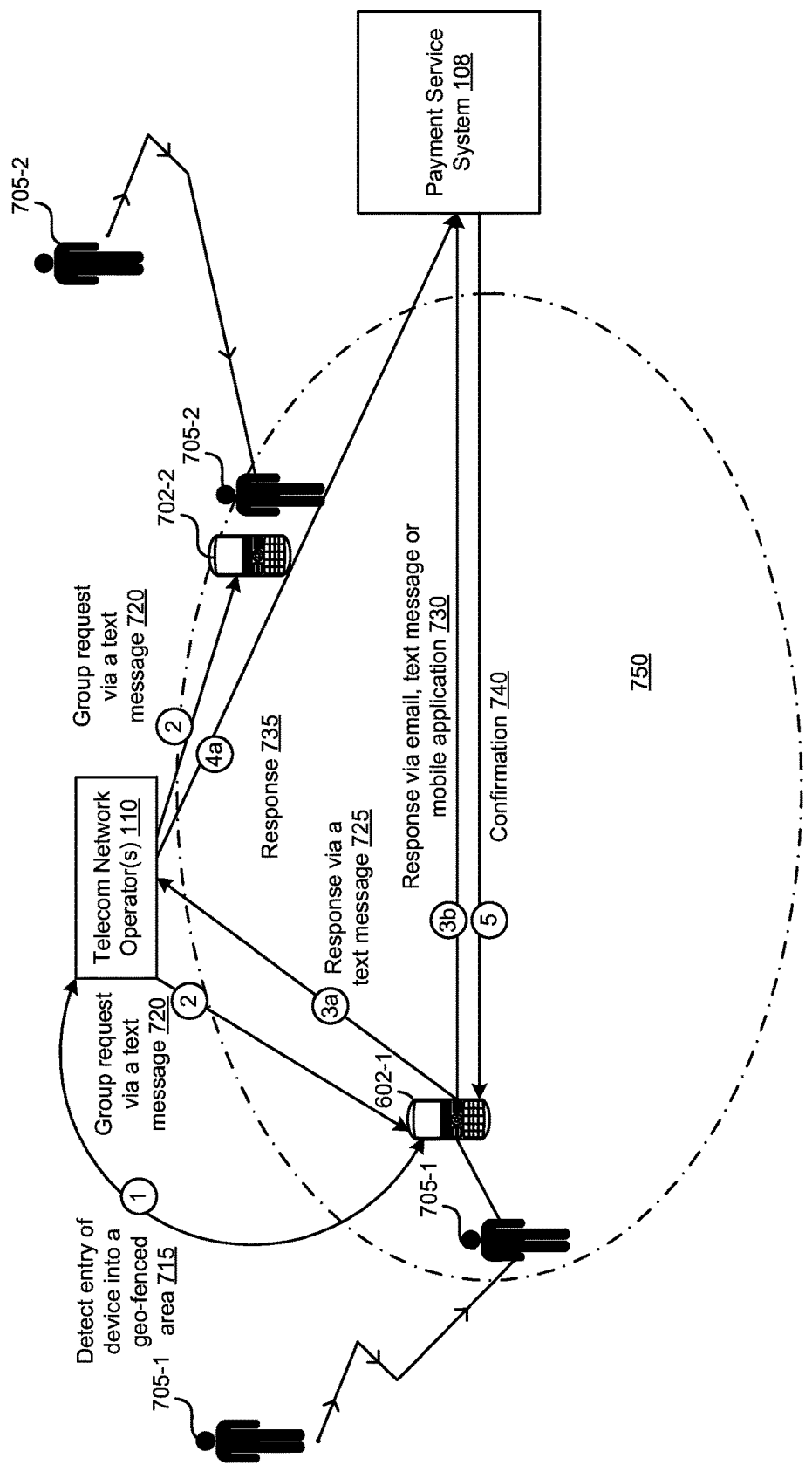
FIG. 7 is a block diagram illustrating a group money transfer flow involving a network operator and a geo-fenced area in accordance with a third embodiment of the group money transfer technology.

FIG. 7 is a block diagram illustrating a group money transfer flow involving a telecom network operator and a geo-fenced in accordance with a third embodiment of the group money transfer technology. In this embodiment, the location monitoring is performed by a telecom network operator 110 (e.g., AT&T, Verizon). Consequently, client devices need not have a payment application installed thereon to receive a group request.

Referring to FIG. 7, when a user 705-1 having a client device 702-1 enters a geo-fenced area 750, a telecom network operator 110 can detect entry of the client device 702-1 into the geo-fenced area 750 (715). The telecom network operator 110 can then send a group request to the client device 702-1 via a text message (720). In some embodiments, the telecom network operator 110 can be configured to send a group request at a predefined time to all client devices (e.g., 702-1, 702-2) that are present in the geo-fenced area 750.

When the user 705-1 or 705-2 responds to the text message confirming the request, the user response is sent to the telecom network operator 110 (725). The telecom network operator 110 then forwards the user response to the payment service system 108 for further processing (735). Alternatively, in some embodiments, the user can respond via an email, text message or via a payment application (if installed), and the user response can be sent to the payment service system 108 (730). The payment service system 108 can then send a confirmation message to the client device 702-1 (740). In some embodiments, the confirmation message can include instructions for providing payment card details to enable the payment service system 109 to deposit an amount corresponding to a group payment to an account associated with the payment card or withdraw an amount corresponding to a group request for payment from the account associated with the payment card.

Figure 8:
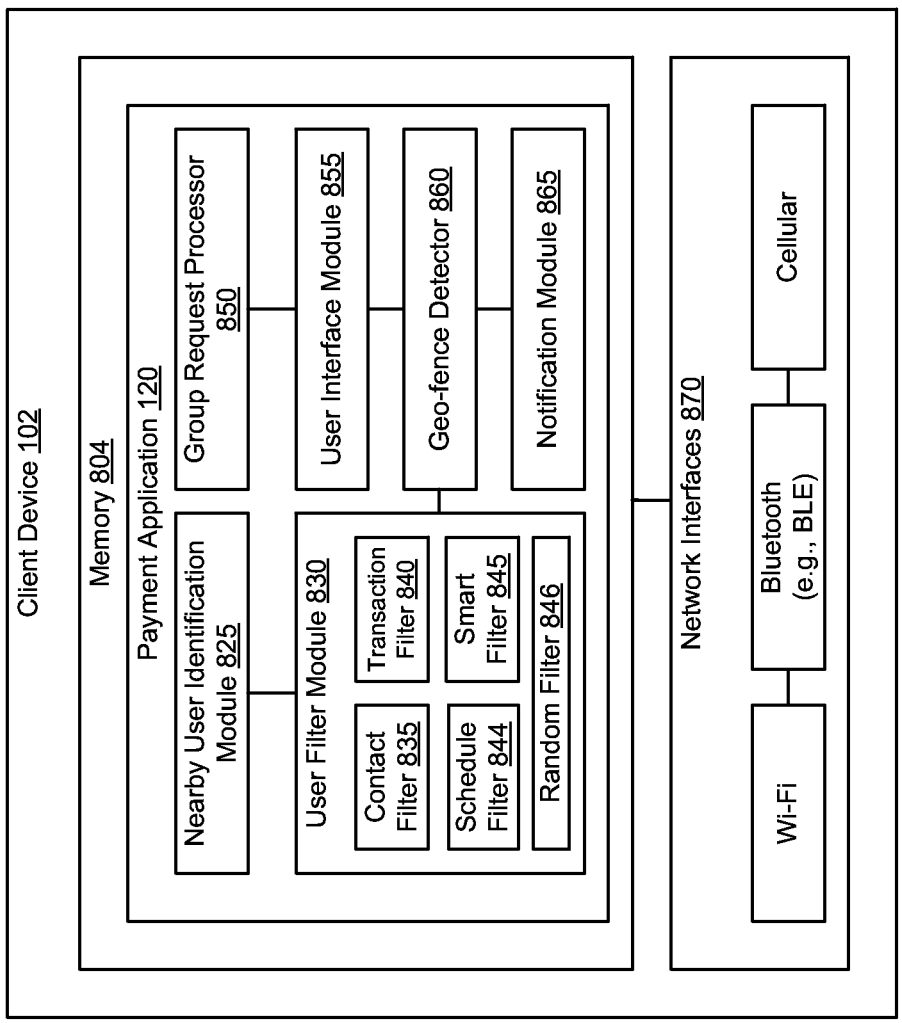
FIG. 8 is a block diagram illustrating example components of a client device implementing the group money transfer technology.

FIG. 8 is a block diagram illustrating example components of a client device implementing the group money transfer technology.

The client device 102 includes a memory 804 for storing instructions associated with multiple modules of the payment application 120. In some embodiments, the payment application 120 can include a nearby user identification module 825, a user filter module 830 having a schedule filter 844, a contact filter 835, a transaction filter 840, a smart filter 845, and/or a random filter 846, a group request processor 850, a user interface module 855, a geo-fence detector 860 and/or a notification module 865. One or more of these components or modules may be optional in some embodiments.

The nearby user identification module 825 identifies multiple devices (and thereby individuals or users associated with the devices) that are nearby or in proximity to the client device 102. In some embodiments, the client device 102 can be considered to be nearby or in proximity of another device when the client device 102 has established a connection with the other device using a network interface such as a BLE network interface. A BLE connection can be established when two devices are within a pre-configured range. A typical BLE connection range is 20 meters, but it is possible to extend this range to over 100 meters. In some embodiments, the maximum range for the BLE connection can be set by the payment application 120. Alternatively, the maximum range can be configured by a user (e.g., via the payment application 120 or via the device settings). In some embodiments, the nearby user identification module 825 can consider another device as being near the client device 102 when the two devices are connected to the same wireless (e.g., Wi-Fi) network (e.g., same wireless access point) or the same cellular network. In yet other embodiments, two devices can be considered to be nearby one another if both devices are within a predefined geo-fenced area (e.g., as detected by the geo-fence detector 860). Once a connection with a nearby device has been established, the nearby user identification module 825 can exchange information (e.g., user identifying information, metadata) with the nearby device over the established connection.

In some embodiments, the user filter module 830 applies one or more filters to select a subset of nearby users that match the filter criteria as users that are likely to be the intended recipients of a group request. The user filter module 830, in some embodiments, can include a contact filter 835, a transaction filter 840, a schedule filter 844 and a smart filter 845. The contact filter 835, when applied, identifies nearby individuals that are also contacts of the sender. The contact filter 835 can access contact data stored in a local datastore on the client device 102. The transaction filter 840, when applied, identifies nearby users with whom the sender has engaged in a transaction in the past or recently. The transaction filter 840 can access transaction history data stored in a local datastore on the client device. The schedule filter 844, when applied, identifies nearby users that are attending the same event as the sender. The schedule filter 844 can access schedule information derived from calendar data, social network posts, email, text messages, instant messages, and/or the like. The schedule information can be gathered and stored at a local datastore or cached on a local cache on the client device 102. In some embodiments, the user filter module 830 can include a random filter 846 that randomly selects nearby users. The random filter 846 can be applied on top of one or more other filters in some embodiments. In some embodiments, the random filter 846 can be configured with one or more restrictions. Such restrictions can be on the number of recipients, maximum and/or minimum amounts, or the like. For example, for a group payment of a total of $20 to be distributed randomly among ten contacts nearby, the random filter 846 can select ten contacts at random, and associate an amount to each contact, without exceeding the total value of $20. The random filter 846 can then provide the selected contacts and the associated amounts to the group request processor 850 to generate a group request.

The group request processor 850 generates a group request for the sender to confirm or modify, and send. The group request processor 850, in some embodiments, receives an amount and a request type corresponding to the group request provided by the sender via a user interface (e.g., generated by the user interface module 855). The group request processor 850 communicates with the nearby user identification module 825 and/or user filter module 830 to identify the intended recipients of the group request. The group request processor 850 then generates the group request that identifies or includes the recipients and the amount of money. In some embodiments, the group request processor 850 can display the group request to the sender for confirmation or modification. Upon receiving confirmation and/or modification (e.g., deletion or addition of one or more recipients) from the sender, the group request processor 850 can send the group request. The sending of the group request causes each of the recipients identified in the group request to receive a payment or a payment request for the amount of money. In some embodiments, the group request processor 850 can send the group request to the payment service system 108 over the Internet (e.g., via Wi-Fi or cellular connection). In other embodiments, the group request processor 850 can generate and send notifications, based on the group request, directly to the recipients' devices over the established connection (e.g., BLE connection). The notifications, depending on the request type, can request approval from each recipient to transfer an amount of money specified in the group request from a financial account associated with the recipient to a financial account associated with the sender, or a notification of a transfer of the amount of money from the sender's financial account to financial accounts associated with the recipients.

The geo-fence detector 860, in some embodiments, can monitor client device 102 location against coordinates corresponding to one or more geo-fenced areas to detect entry into, exit out of or presence of the client device 102 in a geo-fenced area. The geo-fence detector 860 can then trigger the payment application 120 (e.g., the notification module 865) to display a notification corresponding to a group request associated with the geo-fenced area, in some embodiments. In other embodiments, the geo-fence detector 860 can trigger a notification to be sent to the payment service system 108 to report the presence of the client device 102 in the geo-fenced area. The payment service system 108 can then respond with a notification corresponding to a group request associated with the geo-fenced area.

The notification module 865 can generally handle generation and display of any incoming and/or outgoing notifications such as push notifications, email, text messages, and/or the like. The network interface 870 can be a networking module that enables the payment application 120 and the client device 102 to transmit and/or receive data in a network with an entity that is external to the client device 102 (e.g., other client devices, the payment service system 108), through any known and/or convenient communications protocol supported by the client device 102 and the external entity. The network interface 870 can include one or more of a network adaptor card, a wireless network interface card (e.g., SMS interface, Wi-Fi interface, interfaces for various generations of mobile communication standards including but not limited to 1G, 2G, 3G, 3.5G, 4G, LTE, etc.), Bluetooth (e.g., BLE), a router, an access point, a wireless router, a switch, a multilayer switch, a protocol converter, a gateway, a bridge, bridge router, a hub, a digital media receiver, and/or a repeater.

Figure 9:
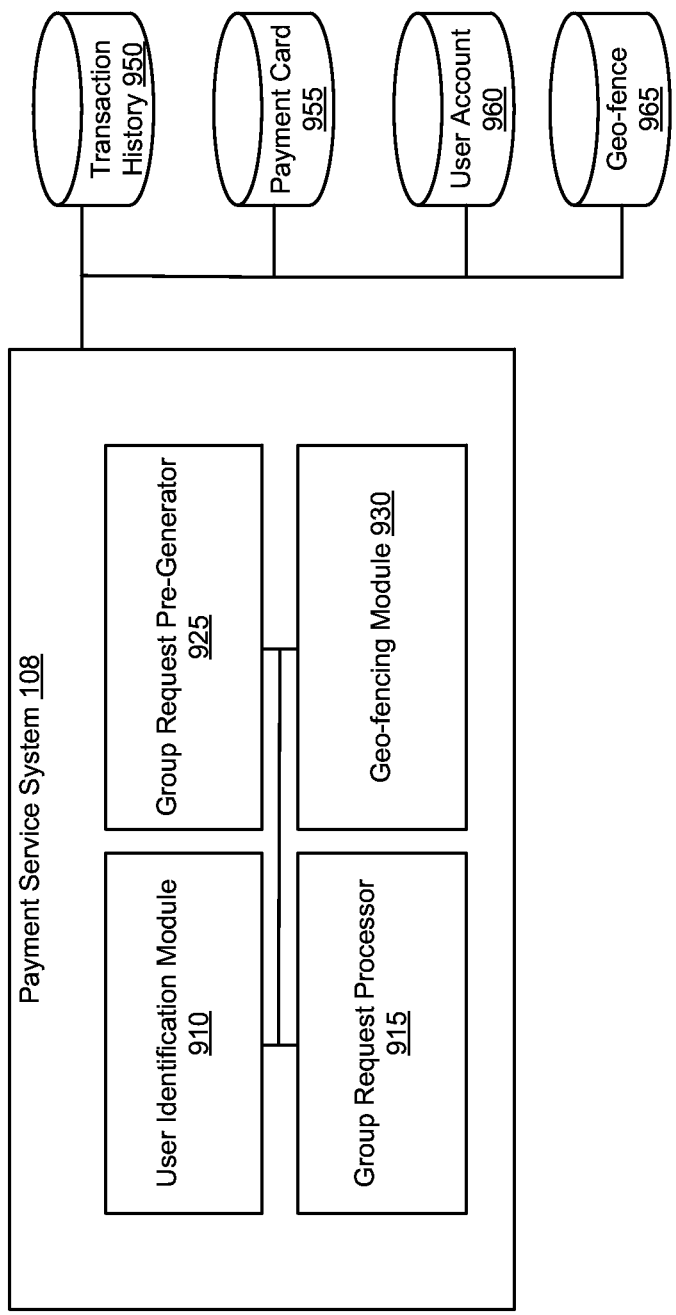
FIG. 9 is a block diagram illustrating example components of a payment service system implementing the group money transfer technology.

FIG. 9 is a block diagram illustrating example components of a payment service system implementing the group money transfer technology.

In some embodiments, the payment service system 108 can include a user identification module 910, a group request processor 915, a group request pre-generator 925, and a geo-fence module 930. One or more of these components can access one or more database tables including a transaction history database table 950, a payment card database table 955, and a user account database table 960 to retrieve data and/or store data.

In some embodiments, the user identification module 910 can respond to requests from a payment application 120 to identify users. For example, device identifiers or aliases can be exchanged between two client devices upon establishing a BLE connection. The payment application 120 in a client device 102 can then query the payment service system 108 using a device identifier or an alias received from another client device over the BLE connection. The user identification module 910 can respond to the query by providing usernames and/or public profile information corresponding to the device identifier or alias to the payment application 120. The user identification module 910 can access data from the user account database table 960, for example, to respond to the query requests for user identification.

The group request processor 915 handles group requests transmitted by a sender. In some embodiments, the group request processor 915 receives a group request and analyzes the group request to determine information contained in the group request. For example, the group request processor 915 can determine recipients of the group request. Such recipients' devices may have been detected to be within a pre-configured vicinity range of the sender's device using a low energy wireless technology such as BLE wireless technology. In some embodiments, the recipients themselves may have matched one or more filter criteria related to contact information, schedule information, transaction information, or the like. The group request processor 915 can also determine an amount of money to be transferred and a request type indicating whether the group request is a group payment or a group request for payment of the determined amount of money. The group request processor 915 can further process the group request based on the request type. For example, when the request type is a group payment of an amount of money, the group request processor 915 can query the user accounts database table 960 to identify a financial account associated with the sender and financial accounts associated with the multiple recipients. The group request processor 915 can then initiate transfers of the amount of money from the financial account associated with the sender to the financial accounts associated with the multiple recipients. Similarly, when the request type is a group request for payment of the amount of money, the group request processor 915 can transmit notifications to the multiple recipients to request approval of the group request for payment of the amount of money. Upon receiving responses from at least some of the multiple recipients approving the group request for payment of the determined amount of money or a different amount of money, the group request processor 915 can initiate transfers of the approved amount of money from financial accounts associated with the recipients to a financial account associated with the sender.

In some embodiments, the group request pre-generator 925 can pre-generate a group request for a user to send when triggered by an event and when one or more conditions are met. Examples of a trigger event can include a transaction activity, a transaction activity exceeding a certain amount, type of merchant associated with a transaction activity, and/or the like. The one or more conditions can be based on location monitoring, schedule information, and/or the like of the user and/or contacts of the user at the time of the transaction activity. The group request pre-generator 925 can also send a notification to the user to confirm sending of the pre-generated request. In some embodiments, the group request pre-generator 925 can be implemented client-side.

In some embodiments, the geo-fence module 930 can enable a user to configure a geo-fenced area which can then be associated with a group request. In some embodiments, the facilities of the geo-fence module 930 can be accessed by users via a web-based user interface. The geo-fence module 930 enables a user to draw a boundary on a map, or provide latitude, longitude and a radius to define a geo-fenced area. In some embodiments, the user can set client side or remote location monitoring to detect entry or exit of a client device into or out of a geo-fenced area. The user can also configure a transmission mechanism, timing and format of the group request. For example, the user can configure a group request to be transmitted by one or more telecom network operators, at 12 pm, as a text message. This mechanism allows all users with devices connected to the telecom network operator's cellular network to receive the group request as a text message. By way of another example, the user can configure the group request to be sent to devices of users when the users exit or enter the geo-fenced area. Data relating to geo-fences can be stored in and accessed from the geo-fence database table 965.

Figure 10:
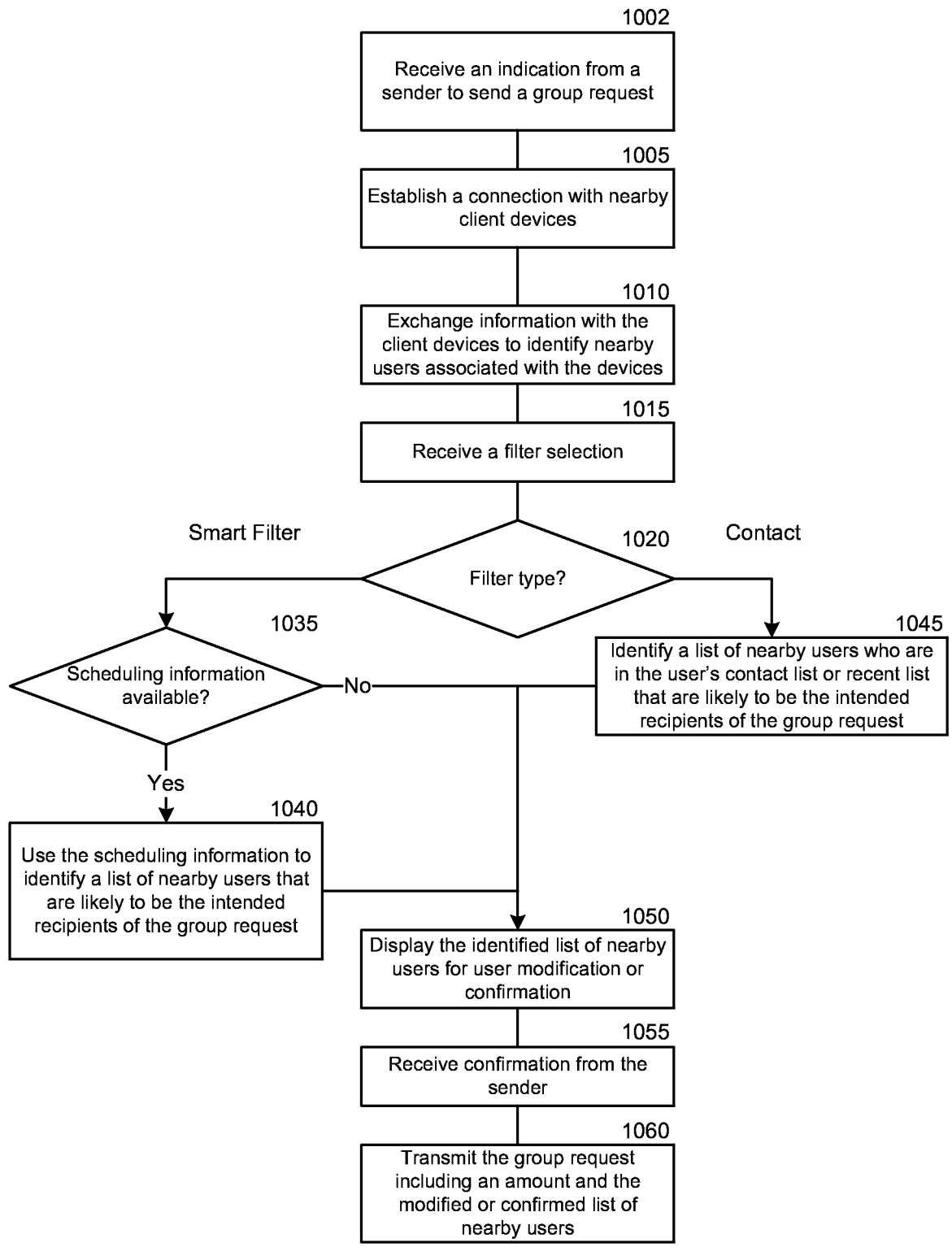
FIG. 10 is a block diagram illustrating example method of generating and sending a group money transfer request to a payment service system.

FIG. 10 is a block diagram illustrating an example method of creating and sending a group money transfer request to a payment service system.

The method starts when a payment application 120 on a client device 102 receives a request or an indication from a sender to send a group payment or a group request for payment at block 1002. For example, in some embodiments, the sender can launch the payment application, select a group payment or group request for payment as a request type and specify an amount. The client device 102 can then establish a connection with nearby client devices at block 1005. In some embodiments, the client device may already be connected to nearby client devices. The connection can be over an interface based on Bluetooth Low Energy (BLE) wireless technology, or other low energy wireless technologies. In some embodiments, the client device can use Wi-Fi technology to establish a connection with nearby client devices. At block 1010, the payment application 12—exchanges user identifying information with the nearby client devices over the connection. For example, the payment application 120 can provide a username, an email address, a phone number, an alias, a device identifier, or the like associated with a user of the payment application 120 to the connected client devices over the connection. Similarly, the payment application can receive similar user identifying information from the nearby client devices over the connection. At block 1015, the payment application 120 receives a filter selection for identifying users that are likely to be the recipients of the group request. In some embodiments, the payment application 120 can automatically select a filter to be applied. If the selected filter type is determined to be a "smart" filter at decision block 1020, the payment application determines if schedule information is available at decision block 1035. If the schedule information is available, the payment application 120, at block 1040, uses the schedule information to identify multiple users from the all the users of nearby client devices that are likely to be recipients of the group payment or group request for payment. In some embodiments, the "smart" filter can use other criteria in addition to schedule criteria to identify the intended recipients. If the selected filter type is "contact" at decision block 1020, or if the schedule information is not available, the payment application 120, at block 1045, identifies a list of nearby users that are contacts of the sender or have recently engaged in a transaction with the sender as likely to be the intended recipients of the group request.

At block 1050, the payment application 120 displays the identified list of intended recipients for user modification and/or confirmation. For example, the sender can de-select or remove any user who should not receive the group request, or add a user who should receive the group request. At block 1055, the payment application 120 receives a confirmation from the sender to send the group request. In response, the payment application 120 transmits the group request to the confirmed list of recipients at block 1060. In some embodiments, the group request can be sent directly to the nearby client devices of the confirmed list of recipients over the BLE connection. In other embodiments, the group request can be sent to the payment service system 108 over a different connection (e.g., Wi-Fi or cellular connection). In this manner, the payment application 120 enables the sender to send a group request to multiple nearby users without having to type in their information or select their usernames, with a single click or tap.

Figure 11:
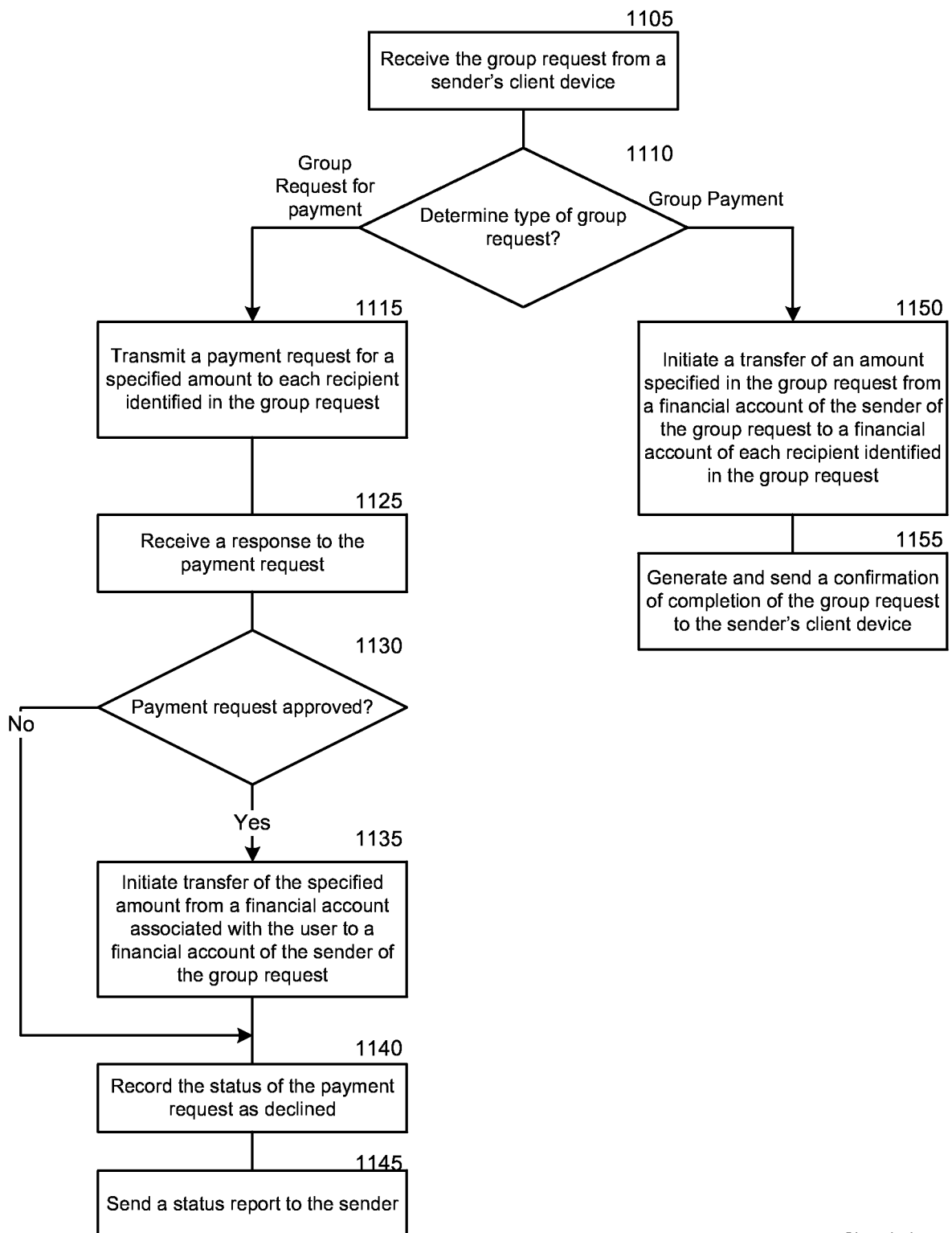
FIG. 11 is a block diagram illustrating example method of processing a group money transfer request by a payment service system.

FIG. 11 is a block diagram illustrating an example method of processing a group money transfer request by a payment service system.

The method starts by the payment service system 108 receiving a group request transmitted from a client device of a sender. The group request is associated with a group payment or a group request for payment, and includes information relating to the sender and multiple recipients, along with an amount. At decision block 1110, the payment service system 108 determines whether the group request is a request for a payment or a payment. If it is a request for payment, for each recipient identified in the group request for payment, the payment service system 108 generates and transmits a request for payment of an amount specified in the group request at block 1115. At block 1125, the payment service system 108 receives a response to the request for payment from the recipient. At decision block 1130, the payment service system 108 determines whether the response approves the payment request. If so, the payment service system 108 initiates a transfer of the specified amount from a financial account associated with the recipient to a financial account of the sender of the group request at block 1135. If not, the payment service system 108 records the status of the payment request as declined or unapproved at block 1140. The payment service system 108 can similarly process any other responses to the payment requests that come in. The payment service system 108 can periodically (e.g., when all the expected responses have been received, or after a time period have passed) send a status report to the sender to provide information on the status of the response from each recipient of the group request at block 1145.

At decision block 1110, if the type of group request is a group payment, the payment service system 108 initiates a transfer of an amount specified in the group request from a financial account of the sender of the group request to a financial account of each recipient identified in the group request at block 1150. At block 1155, the payment service system 108 can generate and send a confirmation of completion of the group request for payment at block 1155.

Figure 12:
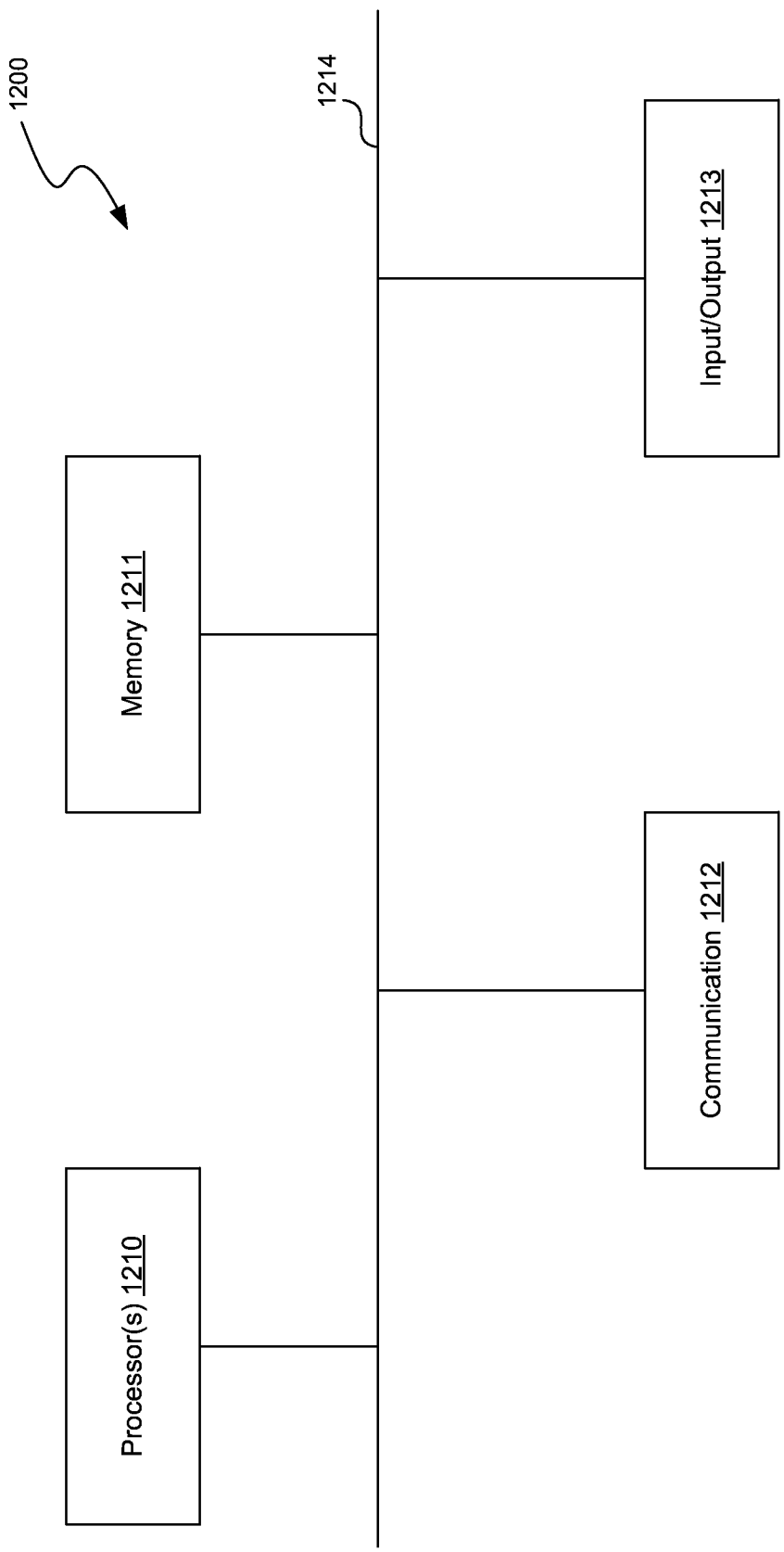
FIG. 12 is a block diagram of an example of a computing system in which at least some operations related to the group money transfer technology can be implemented.

FIG. 12 is a block diagram of an example of a computing system or a processing device 1200 in which at least some operations related to the group money transfer technology can be implemented. The processing device 1200 that can represent any of the devices described above, such as the client devices 102 (e.g., sender device, receiver device), the sender's issuing bank 118A, the receiver's issuing bank 118B, the payment service system 108 and the card payment network 116, and the telecom network operator 110. As noted above, any of these systems may include two or more processing devices such as represented in FIG. 12, which may be coupled to each other via a network or multiple networks.

In the illustrated embodiment, the processing system 1200 includes one or more processors 1210, memory 1211, a communication device 1212, and one or more input/output (I/O) devices 1213, all coupled to each other through an interconnect 1214. The interconnect 1214 may be or include one or more conductive traces, buses, point-to-point connections, controllers, adapters and/or other conventional connection devices.

The processor(s) 1210 may be or include, for example, one or more general-purpose programmable microprocessors, microcontrollers, application specific integrated circuits (ASICs), programmable gate arrays, or the like, or a combination of such devices. The processor(s) 1210 control the overall operation of the processing device 1200.

Memory 1211 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 1211 may store data and instructions that configure the processor(s) 1210 to execute operations in accordance with the embodiments of the technology described above. For example, instructions corresponding to the components of the client device 102 illustrated in FIG. 8 can be stored in the memory 1211.

Similarly, the components the payment service system 108 illustrated in FIG. 9 can also be stored in the memory 1211.

The communication device 1212 may be or include, for example, an Ethernet adapter, cable modem, Wi-Fi adapter, cellular transceiver, Bluetooth radio/transceiver (e.g., Bluetooth 4.0 or BLE), or the like, or a combination thereof. Depending on the specific nature and purpose of the processing device 1200, the I/O devices 1213 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The disclosed technology introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the technology introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.).

It will be apparent to those skilled in the art that various modifications and variations can be made in the embodiments of the disclosed technology. For example, the depicted flow charts may be altered in a variety of ways. The order of the steps may be rearranged, steps may be performed in parallel, steps may be omitted, or other steps may be included. As another example, the actual implementation of the database table may take a variety of forms, and the term "database table" is used herein in the generic sense to refer to any area that allows data to be stored in a structured and accessible fashion using such applications or constructs as databases, tables, linked lists, arrays, and so on. Similarly, any and all of the embodiments described above can be combined with each other, except to the extent that it may be stated otherwise above or to the extent that any such embodiments might be mutually exclusive in function and/or structure. Thus, it is intended that the embodiments of the disclosed technology cover the modifications and variations of the disclosed technology provided they come within the scope of the appended claims and their equivalents.

What is claimed is:

1. A method, comprising:
   receiving, by a payment application executing on a sender mobile device, an indication from a sender to send a message to individuals in proximity to the sender regarding a group money transfer of a specified amount of money;
   establishing, by the sender mobile device in response to the indication from the sender, a wireless connection with a plurality of mobile devices in proximity to the sender mobile device executing an instance of the payment application;
   receiving, by the payment application executing on the sender mobile device through the wireless connection from the instance of the payment application executing on the plurality of mobile devices in proximity to the sender mobile device, user identifying information associated with a user of each of the plurality of mobile devices in proximity to the sender mobile device;
   automatically identifying, by the payment application executing on the sender mobile device, one or more of the plurality of mobile devices in proximity to the sender mobile device as associated with individuals that are in proximity to the sender based on the user identifying information received through the wireless connection between the payment application executing on the sender mobile device and the instance of the payment application executing on the one or more identified mobile devices;
   automatically selecting, by the payment application, a subset of the one or more identified mobile devices as recipient mobile devices based on contextual information comprising a transaction history associated with the sender mobile device and contact information associated with each of the one or more identified mobile devices, wherein the contextual information is accessible via the sender mobile device, wherein the payment application selects a first mobile device of the one or more identified mobile devices as one of the recipient mobile devices when the transaction history indicates the payment application executing on the sender mobile device was previously used to conduct a money transfer transaction with the instance of the payment application executing on the first mobile device and when a contact identifier of the first mobile device, determined by the payment application based on the user identifying information received from the first mobile device, matches a contact identifier on a contact list stored in and retrieved from a local data store on the sender mobile device, thereby representing the first mobile device having a pre-existing association with the sender;
   generating, by the payment application, the message regarding the group money transfer comprising identifiers for the recipient mobile devices, user identifying information for each individual associated with a recipient mobile device, and the specified amount of money by populating the message with contact information corresponding to each of the recipient mobile devices from the contact list stored in the local data store and user identifying information for each individual associated with each of the recipient mobile devices;
   receiving, by the payment application, a confirmation from the sender to send the message to the recipient mobile devices; and
   sending, by the payment application, the message regarding the group money transfer to each recipient mobile device to cause each recipient mobile device to receive a payment of the specified amount of money or a payment request for the specified amount of money.

2. The method of claim 1, wherein the sending further comprises sending the message to a payment service system associated with the payment application to cause the payment service system to:

transfer the specified amount of money from a financial account associated with the sender to financial accounts associated with each individual associated with the recipient mobile device§, when the group money transfer is a group payment; and send a notification to each recipient mobile device to request approval from each recipient mobile device to transfer the specified amount of money from a financial account associated with the individual associated with the recipient mobile device§, to the financial account associated with the sender when the group money transfer is a group request for payment.

3. The method of claim 2, wherein the wireless connection is established using a first network interface, wherein the first network interface is a Bluetooth Low Energy wireless network interface; wherein the wireless connection is a Bluetooth Low Energy wireless connection; and wherein the message to the payment service system is sent using a second network interface, wherein the second network interface is a Wi-Fi or cellular network interface.

4. The method of claim 1, wherein the contextual information comprises:

schedule information derived from calendar events or social network activities, the schedule information being used to identify at least some of the identified mobile devices as associated with an attendee in an event.

5. The method of claim 1, wherein the sending further comprises sending a notification over the wireless connection to each recipient mobile device to cause the instance of the payment application executing on each recipient mobile device to prompt each individual associated with each recipient mobile device to approve the group money transfer of the specified amount of money.

6. A non-transitory processor-readable storage medium storing instructions, the instructions comprising instructions for:

receiving, by a payment service system, an indication from a payment application executing on a sender mobile device operated by a sender to send a message to individuals in proximity to the sender regarding a group money transfer of a specified amount of money;

identifying, by the payment service system, a plurality of mobile devices that are in proximity to the sender mobile device based on user identifying information associated with the plurality of mobile devices that are in proximity to the sender mobile device received by the payment application executing on the sender mobile device from an instance of the payment application executing on the plurality of mobile devices in proximity to the sender mobile device over a wireless connection established by the sender mobile device with the plurality of mobile devices;

generating, by the payment service system, the message regarding the group money transfer by identifying a subset of the plurality of identified mobile devices within the proximity of the sender mobile device as recipient mobile devices, wherein each recipient mobile device is selected based on a transaction history associated with the payment application executing on the sender mobile device indicating that the payment application executing on the sender mobile device was previously used to conduct a money transfer transaction with the instance of the payment application executing on each recipient mobile device and a contact identifier of each recipient mobile device matches a contact identifier on a contact list stored in and retrieved from a local data store on the sender mobile device, and wherein the generating comprises populating the message regarding the group money transfer with the specified amount of money, user identifying information associated with each of the recipient mobile devices, and contact information corresponding to each of the recipient mobile devices from the contact list stored in the local data store; and upon receiving a confirmation from the sender mobile device to send the message regarding the group money transfer to the recipient mobile devices, causing, by the payment service system, each recipient mobile device to receive a payment of the specified amount of money or a request for payment of the specified amount of money.

7. The processor-readable storage medium of claim 6, further comprising instructions for:

applying a context filter to select the recipient mobile devices from the plurality of mobile devices that are in proximity of the sender mobile device.

8. The processor-readable storage medium of claim 7, wherein the context filter includes a transaction filter to identify individuals that the sender has had a transaction with in the past and a schedule filter to identify individuals that are likely to be attending a same event as the sender, or a combination thereof.

9. The processor-readable storage medium of claim 7, further comprising instructions for providing a list of the recipient mobile devices for confirmation or modification by the sender prior to generating the message regarding the group money transfer.

10. The processor-readable storage medium of claim 6, wherein the wireless connection includes a Bluetooth Low Energy wireless connection, and wherein the group request is sent to the payment service system over a separate wireless connection.

11. A method comprising:

receiving, by a payment service system, a message from a payment application executing on a sender mobile device of a sender regarding a group money transfer, the message being generated by the payment application executing on the sender mobile device in response to an indication from the sender;

analyzing, by the payment service system, the message to determine:

one or more recipient identifiers corresponding to one or more recipients having one or more recipient mobile devices that have been detected to be within a pre-configured vicinity range of the sender mobile device using a wireless technology, wherein the pre-configured vicinity range is based on the wireless technology, wherein user identifying information associated with each mobile device of a plurality of mobile devices has been received by the payment application executing on the sender mobile device from an instance of the payment application executing on each mobile device of the plurality of mobile devices within the pre-configured vicinity range of the sender mobile device via a wireless connection established by the sender mobile device with each mobile device of the plurality of mobile devices, wherein a contact identifier of each recipient mobile device matches a contact identifier of a contact list stored in a local data store on the sender mobile device, wherein each recipient mobile device is detected via the wireless connection, wherein a transaction history associated with the payment application executing on the sender mobile device indicates that the payment application executing on the sender mobile device was previously used to conduct a money transfer transaction with the instance of the payment application executing on each recipient mobile device, wherein each recipient mobile device is selected as a recipient mobile device based on the transaction history, the user identifying information, and associated contact identifier stored in and retrieved from the local data store on the sender mobile device, and wherein the message regarding the group money transfer is populated with contact information corresponding to a user associated with each of the recipient mobile devices stored in in the contact list stored in the local data store, an amount of money to be transferred, user identifying information associated with each recipient mobile device, and a request type indicating whether the group money transfer is a group payment of or a group request for payment of the amount of money;

when the request type is a group payment of the amount of money:
identifying a financial account associated with the sender and financial accounts associated with the one or more recipients based on the user identifying information associated with each recipient mobile device, wherein the financial accounts are pre-registered with the payment service system; and
initiating transfers of the amount of money from the financial account associated with the sender to the financial accounts associated with the one or more recipients; and when the request type is a group request for payment of the amount of money:
transmitting, by the payment service system, notifications to the one or more instances of the payment application executing on the recipient mobile devices requesting approval of the group request for payment of the amount of money;
receiving, by the payment service system, responses from at least some of the one or more instances of the payment application executing on the recipient mobile devices approving the group request for payment of the amount of money or a different amount of money; and
in response to receiving the responses, initiating transfers of the approved amount of money from the financial accounts associated with the recipients for whom response have been received to the financial account associated with the sender.

12. The method of claim 11, wherein the one or more recipients are a subset of a group of individuals having mobile devices that are detected to be within the pre-configured vicinity range of the sender mobile device.

13. The method of claim 12, wherein the one or more recipients are selected from the group of individuals based on at least one of:
schedule information associated with the sender, the schedule information providing an indication that the one or more recipients are attending a same event as the sender and are likely to be intended recipients of the group request.

14. The method of claim 11, wherein the wireless technology is a Bluetooth Low Energy wireless technology.

15. A system comprising:
a memory;
a processor coupled to the memory, and configured to execute instructions stored in the memory to:
receive a message regarding a group money transfer from a payment application executing on a sender mobile device associated with a sender to send money to or request money from one or more recipients;
analyze the message to identify the one or more recipients, a specified amount of money, and whether the specified amount of money is to be sent to or requested from the one or more recipients;
wherein the one or more recipients are identified based on location and contextual criteria associated with one or more recipient mobile devices associated the one or more recipients, respectively, and user identifying information associated with the recipient mobile devices received by the payment application executing on the sender mobile device from an instance of the payment application executing on each of the recipient mobile devices via a wireless connection established by the sender mobile device with each of the recipient mobile devices,
wherein a contact identifier of each recipient mobile device matches a contact identifier of a contact list stored in and retrieved from a local data store on the sender mobile device,
wherein a transaction history associated with the payment application executing on the sender mobile device indicates that the payment application executing on the sender mobile device was previously used to conduct a money transfer transaction with the instance of the payment application executing on each recipient mobile device, and
wherein the group request is populated with contact information corresponding to the identified recipients in the contact list stored in and retrieved from the local data store and user identifying information for each of the identified recipients, wherein the identified recipients are selected based on the transaction history, the user identifying information, and contact information corresponding to the identified recipients stored in and retrieved from the local data store on the sender mobile device;
when the specified amount of money is to be sent to the one or more recipients, initiate transfers of the specified amount of money from a financial account associated with the sender to financial accounts associated with the one or more recipients; and
when the specified amount of money is to be requested from the one or more recipients, transmit a notification to each of the instances of the payment application executing on the one or more recipient mobile devices to request approval to transfer the specified amount of money from a financial account associated with the recipient to the financial account associated with the sender.

16. The system of claim 15, wherein the processor is further configured to:
receive a response from the instance of the payment application executing on each recipient mobile device approving the transfer of the specified amount of money or a different amount of money from the financial account associated with the recipient to the financial account of the sender.

17. The system of claim 15, wherein the contextual criteria specifies that the sender mobile device and recipient mobile devices are connected to each other over a Bluetooth Low Energy connection.

18. The system of claim 15, wherein the contextual criteria specifies that the sender mobile device and recipient mobile devices are located in a same geo-fenced area.

19. The system of claim 15, wherein the contextual criteria specifies that the sender mobile device and recipient mobile devices are connected to a same Wi-Fi network or cellular network.

20. The system of claim 15, wherein the contextual criteria specifies that the one or more recipients and the sender are attendees in a calendar event.

21. The system of claim 15, wherein the contextual criteria specifies that the one or more recipients and the sender are tagged in a social network post.

22. The system of claim 15, wherein the contextual criteria specifies that the one or more recipients and the sender have engaged in a transaction in the past.

* * * * *